(12) United States Patent
Hidaka et al.

(10) Patent No.: US 9,416,283 B2
(45) Date of Patent: Aug. 16, 2016

(54) METHOD FOR FORMING ORGANIC THIN FILM

(71) Applicant: Nippon Soda Co., Ltd., Tokyo (JP)

(72) Inventors: Tomoya Hidaka, Chiba (JP); Yoshitaka Fujita, Chiba (JP); Norifumi Nakamoto, Chiba (JP); Kazuhisa Kumazawa, Chiba (JP); Eiji Hoshi, Chiba (JP)

(73) Assignee: Nippon Soda Co., Ltd., Tokyo (JP)

( * ) Notice: Subject to any disclaimer, the term of this patent is extended or adjusted under 35 U.S.C. 154(b) by 5 days.

(21) Appl. No.: 14/486,661

(22) Filed: Sep. 15, 2014

(65) Prior Publication Data

US 2015/0000563 A1    Jan. 1, 2015

Related U.S. Application Data

(62) Division of application No. 12/312,096, filed as application No. PCT/JP2007/072020 on Nov. 13, 2007.

(30) Foreign Application Priority Data

| Nov. 13, 2006 | (JP) | ................ | 2006-307151 |
| Dec. 27, 2006 | (JP) | ................ | 2006-351662 |
| Mar. 12, 2007 | (JP) | ................ | 2007-062660 |

(51) Int. Cl.
  *C04B 41/49* (2006.01)
  *C09D 7/12* (2006.01)
  (Continued)

(52) U.S. Cl.
  CPC .............. *C09D 7/1233* (2013.01); *B05D 7/24* (2013.01); *C03C 17/30* (2013.01); *C08K 5/01* (2013.01); *C08K 5/04* (2013.01); *C08K 5/05* (2013.01); *C08K 5/5419* (2013.01); *C09K 3/18* (2013.01); *B05D 1/185* (2013.01); *B05D 2202/00* (2013.01); *B05D 2203/35* (2013.01); *C03C 2217/76* (2013.01); *C03C 2218/113* (2013.01)

(58) Field of Classification Search
  None
  See application file for complete search history.

(56) References Cited

U.S. PATENT DOCUMENTS

| 7,776,403 B2 | 8/2010 | Kimura et al. |
| 8,133,546 B2 | 3/2012 | Kumazawa |

(Continued)

FOREIGN PATENT DOCUMENTS

| EP | 1 484 105 | 12/2004 |
| EP | 1 797 967 | 6/2007 |

(Continued)

OTHER PUBLICATIONS

Japanese Patent Office, International Search Report (translated) dated Feb. 26, 2008, from related International Patent Application No. PCT/JP2007/072020.

(Continued)

*Primary Examiner* — Kaj K Olsen
*Assistant Examiner* — Ross J Christie
(74) *Attorney, Agent, or Firm* — Kenyon & Kenyon LLP

(57) ABSTRACT

A solution for forming an organic thin film wherein the total starting amount of metal surfactants (A) and (B) is 0.05 to 50 wt %, the amount of a hydroxyl group-containing compound generated with the progress of the hydrolysis reaction is 20 ppm to 6 wt %, and the amount of a compound (C) that can interact with the metal surfactant is 0.01 ppm to 8 ppm in terms of metal, relative to the total amount of the solution for forming an organic thin film.

1 Claim, 1 Drawing Sheet

(51) Int. Cl.

| | | |
|---|---|---|
| *B05D 7/24* | (2006.01) | |
| *C03C 17/30* | (2006.01) | |
| *C09K 3/18* | (2006.01) | |
| *C08K 5/01* | (2006.01) | |
| *C08K 5/04* | (2006.01) | |
| *C08K 5/05* | (2006.01) | |
| *C08K 5/5419* | (2006.01) | |
| *B05D 1/18* | (2006.01) | |

(56) References Cited

U.S. PATENT DOCUMENTS

| | | | |
|---|---|---|---|
| 8,568,836 | B2 | 10/2013 | Kimura et al. |
| 2005/0167004 | A1 | 8/2005 | Kimura et al. |
| 2006/0188657 | A1 | 8/2006 | Kimura et al. |
| 2008/0213494 | A1* | 9/2008 | Kimura .................. B05D 1/185 427/430.1 |

FOREIGN PATENT DOCUMENTS

| | | |
|---|---|---|
| JP | 04-132637 | 5/1992 |
| JP | 04-221630 | 8/1992 |
| JP | 04-367721 | 12/1992 |
| JP | 08-337654 | 12/1996 |
| JP | 09-208438 | 8/1997 |
| JP | 11-228942 | 8/1999 |
| JP | 11-322368 | 11/1999 |
| JP | 2006110476 | 4/2006 |
| JP | 2007-322181 | 12/2007 |
| WO | WO 2006009202 A1 * 1/2006 ............. B05D 1/185 |

OTHER PUBLICATIONS

K. Kojio et al., "Novel Method to Prepare Organosilane Monolayers on Solid Substrate," *Bull. Chem. Soc. Jap.*, 74, 1397-1401 (2001).

International Preliminary Report on Patentability and Written Opinion (translated) dated May 26, 2009, from related International Patent Application No. PCT/JP2007/072020.

European Search Report dated Feb. 4, 2011, from related EP Application No. 07831750.0 (2 pages).

* cited by examiner

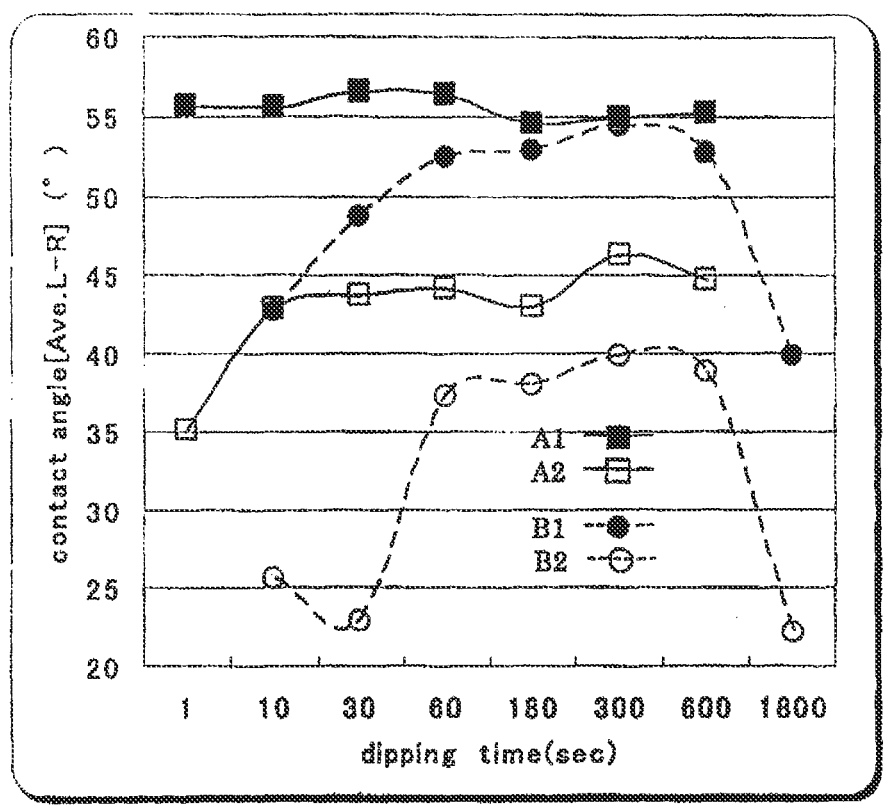

METHOD FOR FORMING ORGANIC THIN FILM

CROSS-REFERENCE TO RELATED APPLICATIONS

This application is a divisional application of U.S. application Ser. No. 12/312,096, filed on Apr. 24, 2009, issued as U.S. Pat. No. 8,864,896, on Oct. 21, 2014, which is a national stage application of International Application No. PCT/JP2007/072020, filed on Nov. 13, 2007, which claims priority to Japanese Patent Application No. 2006-307151, filed on Nov. 13, 2006, Japanese Patent Application No. 2006-351662, filed on Dec. 27, 2006, and Japanese Patent Application No. 2007-062660, filed on Mar. 12, 2007, each of which is incorporated by reference in its entirety.

TECHNICAL FIELD

The present invention relates to a method for forming an organic thin film for forming an organic thin film on a substrate surface, particularly to an improved method for forming an organic thin film consisting of hydrolysable products of a metal surfactant.

BACKGROUND ART

Conventionally, property modification of a surface of a substrate consisting of glass, metal, plastic or ceramics, is performed in various field, according to its purpose. For example, a method comprising coating a fluorine-containing silane coupling agent, in order to confer water repellency and oil repellency to the surface of glass or plastics can be exemplified.

As a method for forming a coating film to improve a substrate surface, for example, Patent References 1 to 3 disclose a method for producing a chemisorbed film, which has high peel resistance and high transparence, and which gloss of the substrate surface and transparency of the substrate are not lost. However, the methods for producing a chemisorbed film described in these references comprise forming a coating by a dehydrochloric acid reaction of a chlorosilane surfactant and an active hydrogen of the substrate surface, which had drawbacks of generating a harmful chlorine gas when producing the film.

A method for forming a chemisorbed film by a dealcohol reaction of alkoxysilane surfactant is also known. However, this method had drawbacks that the reaction velocity of dealcohol reaction is slow and that the film forming was not easy to conduct.

Further, a method of promoting dealcohol reaction by using a dealcohol catalyst is proposed, while by merely adding a dealcohol catalyst, the surfactant will cross-link by itself due to the moisture in the air, thereby inhibiting the reaction in the solid-liquid interface of the substrate surface, and it was difficult to form a monomolecular chemisorbed film with good efficiency.

In order to resolve these problems, in Patent Reference 4 is proposed a method for forming a chemisorbed film covalently-bond via a siloxane-bond, by allowing the substrate surface to contact with a mixed solution containing at least an alkoxysilane surfactant, a non-aqueous solvent not containing active hydrogen, and a silanol condensation catalyst. As a silanol condensation catalyst, at least one substance selected from metal carboxylate, metal carboxylate ester, metal carboxylate polymer, metal chelate carboxylate, titanate ester, and titanate ester chelate, is exemplified.

Further, as a method for forming a chemisorbed film having crystalline property on a substrate surface, a method of forming a crystalline monomolecular film comprising developing an organic solvent solution of silane surfactant on a silicone wafer surface where purified water has been dropped, is disclosed in non-patent reference 1.

Further, in Patent Documents 5 and 6, it is known a method for fixing a water-repellant coating film consisting of monomolecular layer, to a substrate surface via a silanol group, by using a monomer or polymer of a hydrolysate of fluoroalkyl group-containing silane compound which has been hydrolysed in the presence of an acid catalyst.

However, this method requires a long time for film forming, and it had drawbacks such that when film forming is conducted while silanol condensation catalysts, etc, are remained in the solution, these catalysts inhibit the adsorption, and a dense monomolecular film could not be formed. Further, in these methods, the types of substrates which can be used are limited, and a crystalline chemisorbed film could not be formed on a non-crystalline substrate.

Therefore, particularly in the field of fine patterning in the design of electric devices, the development of a technology for quickly forming a dense monomolecular film with less impurity was awaited.

Thus, the present inventors developed a method for reducing the film forming time, by using a solution for forming an organic thin film which moisture content has been adjusted or kept to be 50 to 1000 ppm, when allowing the substrate to contact with an organic solvent solution obtained by mixing a metal surfactant having a hydrolysable group and a catalyst that can interact with the metal surfactant, or with the solution for forming an organic thin film obtained from the organic solvent solution and the metal surfactant having a hydrolysable group (Patent Document 7).

However, with this method, as catalysts tend to precipitate, etc. due to the high catalyst concentration, the solution for forming an organic thin film cannot be stored for a long time. Further, this method requires a long time for preparing an organic thin film since it cannot be carried out with a low amount of water.

Patent Document 1: Japanese Laid-Open Patent Application No. 4-132637
Patent Document 2: Japanese Laid-Open Patent Application No. 4-221630
Patent Document 3: Japanese Laid-Open Patent Application No. 4-367721
Patent Document 4: Japanese Laid-Open Patent Application No. 8-337654
Patent Document 5: Japanese Laid-Open Patent Application No. 11-228942
Patent Document 6: Japanese Laid-Open Patent Application No. 11-322368
Patent Document 7: WO2006/009202
Non-Patent Document 1: Bull. Chem. Soc. Jpn., 74, 1397-1401

DISCLOSURE OF THE INVENTION

Object to be Solved by the Present Invention

The present invention has been made in view of such circumstances, and it is intended to provide a method for forming an organic thin film with which a dense monomolecular film with less impurity can be quickly formed even with a low amount of water.

Means to Solve the Object

The present inventors made a keen study to solve the above objects, and found out that a dense monomolecular film (organic thin film) with less impurity can be quickly formed on a substrate even with a low amount of water as low as 10 ppm to less than 50 ppm, by the following steps: when preparing a solution for forming an organic thin film obtained by adding a metal surfactant (B) having at least one or more hydrolysable group to an adjuvant for forming an organic thin film obtained by mixing a metal surfactant (A) having at least one or more hydrolysable group and a compound (C) that can interact with the metal surfactant, preparing a hydroxyl group-containing solution by reducing the concentration of the compound that can interact with the metal surfactant compared to the conventional method (method of WO2002/009202), and by increasing the amount of the metal surfactant compared to the conventional method (method of WO2006/009202); and after the concentration of the hydroxyl group achieves equilibrium, in the preparation step of the hydroxyl group-containing solution diluting the solution with an organic solvent. The present invention has been thus completed.

Specifically, the present invention relates to:

(1) a method for forming an organic thin film comprising the following steps:

1) a step of preparing a hydroxyl group-containing solution by mixing the following (a), (b) and (c) so that the total amount of (A) and (B) in the hydroxyl group-containing solution becomes 0.1 wt % to 80 wt %, and conducting hydrolysis to generate a hydroxyl group-containing compound;

a) an adjuvant for forming an organic thin film comprising a metal surfactant (A) having at least one or more hydrolysable group, and a compound (C) that can interact with the metal surfactant, in an organic solvent b) a metal surfactant (B) having at least one or more hydrolysable group, and c) water 2) a step for preparing a solution for forming an organic thin film by mixing an organic solvent and the hydroxyl group-containing solution obtained in the above step 1); and 3) a step of allowing the substrate to contact with the solution for forming an organic thin film obtained in the above step 2).

(2) the method for forming an organic thin film according to (1), wherein the adjuvant for forming an organic thin film is obtained by mixing the metal surfactant (A), a compound (C) that can interact with the metal surfactant, and water in an organic solvent;

(3) the method for forming an organic thin film according to (1), wherein the water content in the solution for forming an organic thin film is 10 ppm to 2000 ppm;

(4) the method for forming an organic thin film according to (1), wherein the compound (C) that can interact with the metal surfactant is a at least one type selected from the group consisting of metal hydroxide, metal alkoxides, partially hydrolyzed product of metal alkoxides, and silanol condensation catalyst, and the amount of (C) in the adjuvant for forming an organic thin film is 0.1 ppm to 5 wt % in terms of metal;

(5) the method for forming an organic thin film according to (1), wherein the compound (C) that can interact with the metal surfactant is an acid catalyst, and is in an amount of 0.001 mmol to 1 mol per 1 mol of the metal surfactant [(A) and (B)];

(6) the method for forming an organic thin film according to (4), wherein the metal of the metal alkoxides or partially hydrolyzed product of metal alkoxides is at least one type selected from the group consisting of titanium, zirconium, aluminum, silicon, iron, germanium, indium, tin, tantalum, zinc, tungsten, and lead;

(7) the method for forming an organic thin film according to (1), wherein the metal surfactant (A) is a compound represented by formula (I)

$$R^1_n MX_{m-n} \quad (I)$$

(wherein $R^1$ represents a hydrocarbon group with 1 to 30 carbons optionally having a substituent, a halogenated hydrocarbon group with 1 to 30 carbons optionally having a substituent, a hydrocarbon group comprising a linking group, or a halogenated hydrocarbon group comprising a linking group; M represents at least one metal atom selected from the group consisting of silicon atom, germanium atom, tin atom, titanium atom and zirconium atom; X represents a hydroxyl group or hydrolysable group; and m represent an atomic valence of M; n represents a positive integer of 1 to (m−1); with the proviso that when n is 2 or more, each $R^1$ may be the same or different, and when (m−n) is 2 or more, each X may be the same or different), or its oligomer;

(8) the method for forming an organic thin film according to (1), wherein the metal surfactant (B) is a compound represented by formula (III)

$$R^{11}_n M^1 X^1_{m1-n1} \quad (III)$$

(wherein $R^{11}$ represents a hydrocarbon group with 1 to 30 carbons optionally having a substituent, a halogenated hydrocarbon group with 1 to 30 carbons optionally having a substituent, a hydrocarbon group comprising a linking group, or a halogenated hydrocarbon group comprising a linking group; $M^1$ represents at least one metal atom selected from the group consisting of silicon atom, germanium atom, tin atom, titanium atom and zirconium atom; $X^1$ represents a hydroxyl group or hydrolysable group; $m^1$ represents an atomic valence of $M^1$; $n^1$ represents a positive integer of 1 to ($m^1$−1); with the proviso that when $n^1$ is 2 or more, each $R^{11}$ may be the same or different, and when ($m^1$−$n^1$) is 2 or more, each $X^1$ may be the same or different), or its oligomer;

(9) the method for producing an organic thin film according to (1), wherein the hydrolysable group is an alkoxy group with 1 to 4 carbons or an acyloxy group with 1 to 4 carbons;

(10) the method for producing an organic thin film according to (1), wherein the organic solvent is a hydrocarbonic solvent or fluorocarbonic solvent;

(11) a method for producing an organic thin film comprising the following steps:

1) a step of preparing a hydroxyl group-containing solution by mixing the following a), b) and c) so that the amount of a metal surfactant in the hydroxyl group-containing solution becomes 0.1 wt % to 80 wt %, and performing hydrolysis to generate a hydroxyl group-containing compound;

a) a metal surfactant comprising at least one or more hydrolysable group b) a compound (C) that can interact with the metal surfactant, and c) water 2) a step of preparing a solution for forming an organic thin film by mixing an organic solvent and the hydroxyl group-containing solution obtained in the above step 1);

3) a step of allowing the substrate to contact with the solution for forming an organic thin film obtained in the above step 2).

Further, the present invention relates to (12) a solution for forming an organic thin film wherein the total starting amount of metal surfactants (A) and (B) is 0.05 to 50 wt %, the amount of a hydroxyl group-containing compound generated with the progress of the hydrolysis reaction is 20 ppm to 6 wt %, and the amount of a compound (C) that can react with the metal surfactant is 0.01 ppm to 8 ppm in terms of metal, relative to the total amount of the solution for forming an organic thin film.

BRIEF EXPLANATION OF DRAWINGS

FIG. 1 is a graph showing a dynamic contact angle on a thin film of the present invention, and on a thin film of a conventional method. The horizontal axis shows the immersion time of the substrate to the solution, and the longitudinal axis shows the dynamic contact angle of the liquid droplet on a thin film. The smaller the difference between the angle of advance and the angle of reverse is, the more the surface is smooth. ■ and □ show the angles of the present invention, and ● and ○ show the conventional method (the method of WO2006/009202).

BEST MODE FOR CARRYING OUT THE INVENTION

The present invention is explained in detail in the following.

The method for forming an organic thin film of the present invention is a method for forming an organic thin film on a substrate surface comprising allowing the substrate to contact with a solution for forming an organic thin film obtained by mixing an adjuvant for forming an organic thin film obtained by mixing a metal surfactant (A) having at least one or more hydrolysable group and a compound (C) that can interact with the metal surfactant, with a metal surfactant (B) having at least one or more hydrolysable group, wherein a hydrolysis reaction is conducted by reducing the used amount of the compound (C) that can interact with the metal surfactant, and increasing the added amount of the metal surfactants (A) and (B); and preparing a solution for forming an organic thin film by diluting the mixture with an organic solvent, after the concentration of hydroxyl group has achieved equilibrium.

(Metal Surfactants (A) and (B))

The "metal surfactant (A)" and "metal surfactant (B)" used in the present invention are not particularly limited as long as they have one or more hydrolysable functional group, and have a hydrophilic moiety and hydrophobic moiety in the molecule.

As for the metal surfactant (A), it is preferred to use 1 or more compounds represented by the above formula (I), and as for the metal surfactant (B), it is preferred to use one or more compounds represented by the above formula (III). The metal surfactants (A) and (B) may be the same or different.

The metal surfactants (A) and (B) may be 1 or more oligomers of a compound represented by formula (I) or (III). The oligomer is usually a dimer to decamer, preferably dimer to pentamer, and more preferably a dimer or trimer.

In the present invention, a metal surfactant may be (A) or (B) alone, or their oligomer alone, or a mixture thereof.

In the above formula (I), $R^1$ represents a hydrocarbon group with 1 to 30 carbons optionally having a substituent, a halogenated hydrocarbon group with 1 to 30 carbons optionally having a substituent, a hydrocarbon group comprising a linking group, or a halogenated hydrocarbon group comprising a linking group. In the above formula (III), $R^{11}$ represents a hydrocarbon group with 1 to 30 carbons optionally having a substituent, a halogenated hydrocarbon group with 1 to 30 carbons optionally having a substituent, a hydrocarbon group comprising a linking group, or a halogenated hydrocarbon group comprising a linking group.

Examples of a hydrocarbon group with 1 to 30 carbons optionally having a substituent of $R^1$ and $R^{11}$ include: an alkyl group such as methyl group, ethyl group, n-propyl group, isopropyl group, n-butyl group, isobutyl group, sec-butyl group, t-butyl group, n-pentyl group, isopentyl group, neopentyl group, t-pentyl group, n-hexyl group, isohexyl group, n-heptyl group, n-octyl group, n-decyl group, and n-octadecyl group; alkenyl group such as vinyl group, propenyl group, butenyl group, pentenyl group, n-decynyl group, and n-octadecynyl group; and aryl group such as phenyl group, 1-naphtyl group and 2-naphtyl group.

Examples of halogenated hydrocarbon groups of a halogenated hydrocarbon group with 1 to 30 carbons optionally having a substituent of $R^1$ and $R^{11}$ include a halogenated alkyl group with 1 to 30 carbons, a halogenated alkenyl group with 1 to 30 carbons, and a halogenated aryl group with 1 to 30 carbons. Specifically, halogenated groups of the above exemplified hydrocarbon groups can be exemplified. Among these, a group wherein 2 or more hydrogen atoms in the alkyl group with 1 to 30 carbons are substituted with a halogen atom is preferred, and a fluorinated alkyl group wherein 2 or more hydrogen atoms in the alkyl group with 1 to 30 carbons are substituted with a fluorine atom is more preferred. Further, when the fluorinated alkyl group has a branched structure, it is preferred that the branched moiety is a short chain with 1 to 4 carbons, and more preferably with 1 to 2 carbons.

As for a fluorinated alkyl group of $R^1$ and $R^{11}$, a group wherein one or more fluorine atom is bound to the terminal carbon atom is preferred, and a group having a $CF_3$ group moiety in which 3 fluorine atoms are bound to the terminal carbon atom is more preferred. Particularly preferred is a group having a perfluoroalkyl moiety at the terminal part wherein all the hydrogen atoms in the alkyl group are substituted with fluorine atoms, and having an alkylene group represented by $—(CH_2)_h—$ (wherein h represents an integer of 1 to 29) between the metal atom M or $M^1$, described in the following.

The number of fluorine atoms in the fluorinated alkyl group is preferred to be 60% or more, more preferably 80% or more, when represented by [(number of fluorine atoms in the fluorinated alkyl group)/(number of hydrogen atoms present in an alkyl group having the same number of carbons with the corresponding fluorinated alkyl group)×100]%.

As a "substituent" of the above hydrocarbon group optionally having a "substituent", or of the halogenated hydrocarbon group optionally having a "substituent" of $R^1$ and $R^{11}$, examples include a carboxyl group; amido group; imido group; ester group; alkoxy group such as methoxy group and ethoxy group, or a hydroxyl group. The number of these substituents is preferred to be 0 to 3.

As a hydrocarbon group of a hydrocarbon group comprising a linking group of $R^1$ and $R^{11}$, specific examples include the same groups as exemplified as a hydrocarbon group of the above-mentioned hydrocarbon group optionally having a substituent.

As a halogenated hydrocarbon group of a halogenated hydrocarbon group comprising a linking group of $R^1$ and $R^{11}$, specific examples include the same groups exemplified as a halogenated hydrocarbon group of the above-mentioned halogenated hydrocarbon group optionally having a substituent.

The above linking group is preferred to be present between a carbon-carbon bond of the hydrocarbon group or of the halogenated hydrocarbon group; or between a carbon of the hydrocarbon group and metal atom M described in the following.

Specific examples of linking group include: —O—, —S—, —SO$_2$—, —CO—, —C(=O)O—, or —C(=O)NR$^{51}$— (wherein R$^{51}$ represents a hydrogen atom; or an alkyl group such as methyl group, ethyl group, n-propyl group and isopropyl group).

Among these, R$^1$ and R$^{11}$ are preferred to be an alkyl group with 1 to 30 carbons, fluorinated alkyl group with 1 to 30 carbons, or fluorinated alkyl group comprising a linking group, respectively from the view points of water-repellency and durability.

More preferred examples of R$^1$ and R$^{11}$ include the followings, but are not limited to these.

CH$_3$—, CH$_3$CH$_2$—, (CH$_3$)$_2$CH—, (CH$_3$)$_3$C—, CH$_3$(CH$_2$)$_2$—, CH$_3$(CH$_2$)$_3$—, CH$_3$(CH$_2$)$_4$—, CH$_3$(CH$_2$)$_5$, CH$_3$(CH$_2$)$_6$—, CH$_3$(CH$_2$)$_7$—, CH$_3$(CH$_2$)$_8$—, CH$_3$(CH$_2$)$_9$—, CH$_3$(CH$_2$)$_{10}$—, CH$_3$(CH$_2$)$_{11}$—, CH$_3$(CH$_2$)$_{12}$—, CH$_3$(CH$_2$)$_{13}$—, CH$_3$(CH$_2$)$_{14}$—CH$_3$(CH$_2$)$_{15}$—, CH$_3$(CH$_2$)$_{16}$—, CH$_3$(CH$_2$)$_{17}$—, CH$_3$(CH$_2$)$_{18}$—, CH$_3$(CH$_2$)$_{19}$—, CH$_3$(CH$_2$)$_{20}$—, CH$_3$(CH$_2$)$_{21}$—, CH$_3$(CH$_2$)$_{22}$—, CH$_3$(CH$_2$)$_{23}$—, CH$_3$(CH$_2$)$_{24}$—, CH$_3$(CH$_2$)$_{25}$—, CF$_3$—, CF$_3$CF$_2$—, (CF$_3$)$_2$CF—, (CF$_3$)$_3$C—, CF$_3$(CH$_2$)$_2$—, CF$_3$(CF$_2$)$_3$(CH$_2$)$_2$—, CF$_3$(CF$_2$)$_5$(CH$_2$)$_2$—, CF$_3$(CF$_2$)$_7$(CH$_2$)$_2$—, CF$_3$(CF$_2$)$_3$(CH$_2$)$_3$—, CF$_3$(CF$_2$)$_5$(CH$_2$)$_3$—, CF$_3$(CF$_2$)$_7$(CH$_2$)$_3$—, CF$_3$(CF$_2$)$_4$O(CF$_2$)$_2$(CH$_2$)$_2$—, CF$_3$(CF$_2$)$_4$O(CF$_2$)$_2$(CH$_2$)$_3$—, CF$_3$(CF$_2$)$_7$O(CF$_2$)$_2$(CH$_2$)$_2$—, CF$_3$(CF$_2$)$^7$CONH(CH$_2$)$_2$—, CF$_3$(CF$_2$)$_7$CONH(CH$_2$)$_3$—, CF$_3$(CF$_2$)$_3$O[CF(CF$_3$)CF(CF$_3$)O]$_2$CF(CF$_3$)CONH(CH$_2$)$_3$—, CH$_3$(CF$_2$)$_7$(CH$_2$)$_2$—, CH$_3$(CF$_2$)$_8$(CH$_2$)$_2$—, CH$_3$(CF$_2$)$_9$(CH$_2$)$_2$—, CH$_3$(CF$_2$)$_{10}$(CH$_2$)$_2$—, CH$_3$(CF$_2$)$_{11}$(CH$_2$)$_2$—, CH$_3$(CF$_2$)$_{12}$(CH$_2$)$_2$—, CH$_3$(CF$_2$)$_7$(CH$_2$)$_3$—, CH$_3$(CF$_2$)$_9$(CH$_2$)$_3$—, CH$_3$(CF$_2$)$_{11}$(CH$_2$)$_3$—, CH$_3$CH$_2$(CF$_2$)$_6$(CH$_2$)$_2$—, CH$_3$CH$_2$(CF$_2$)$_8$(CH$_2$)$_2$—, CH$_3$CH$_2$(CF$_2$)$_{10}$(CH$_2$)$_2$—, CH$_3$(CF$_2$)$_4$O(CF$_2$)$_2$(CH$_2$)$_2$—, CH$_3$(CF$_2$)$_7$(CH$_2$)$_2$O(CH$_2$)$_3$—, CH$_3$(CF$_2$)$_8$(CH$_2$)$_2$O(CH$_2$)$_3$—, CH$_3$(CF$_2$)$_9$(CH$_2$)$_2$O(CH$_2$)$_3$CH$_3$CH$_2$(CF$_2$)$_6$(CH$_2$)$_2$O(CH$_2$)$_3$—, CH$_3$(CF$_2$)$_6$CONH(CH$_2$)$_3$—, CH$_3$(CF$_2$)$_8$CONH(CH$_2$)$_3$—, CH$_3$(CF$_2$)$_3$O[CF(CF$_3$)CF(CF$_3$)O]$_2$CF(CF$_3$)CONH(CH$_2$)$_3$—.

M and M$^1$ each independently represents one kind of atom selected from the group consisting of silicon atom, germanium atom, tin atom, titanium atom and zirconium atom. Among these, it is particularly preferred that both M and M$^1$ are silicon atom from the view points of easiness to obtain the raw material, reactivity etc.

X and X$^1$ each independently represents a hydroxyl group or a hydrolysable group, and the hydrolysable group is not particularly limited as long as it is a group that degrades by reacting with water. Specific examples include an alcoxy group with 1 to 6 carbons optionally having a substituent; acyloxy group optionally having a substituent; halogen atom such as fluorine atom, chlorine atom, bromine atom and iodine atom; isocyanate group; cyano group; amino group; or amido group.

Examples of alkoxy group with 1 to 6 carbons include methoxy group, ethoxy group, n-propoxy group, isopropoxy group, n-butoxy group, sec-butoxy group, t-butoxy group, n-pentyloxy group, and n-hexyloxy group. Examples of acyloxy group include: acetoxy group, propionyloxy group, n-propylcarbonyloxy group, isopropylcarbonyloxy group, and n-butylcarbonyloxy group. As substituents thereof, carboxyl group, amido group, imido group, ester group, hydroxyl group and the like can be exemplified. Among these, hydroxyl group, alkoxy group with 1 to 4 carbons, acyloxy group, halogen atom, or isocyanate group are preferred as X and X$^1$, and alkoxy group with 1 to 4 carbons or acyloxy group are more preferred.

n represents any integer of 1 to (m−1). n$^1$ represents any integer of 1 to (m$^1$−1). It is preferred that n and n$^1$ are 1 for producing an organic thin film of a high density.

m represents the atomic valence of metal atom M, and m$^1$ represents the atomic valence of metal atom M$^1$.

When n is 2 or more, each R$^1$ may be the same or different. Further, when (m−n) is 2 or more, each X may be the same or different. When n$^1$ is 2 or more, each R$^{11}$ may be the same or different. Further, when (m$^1$−n$^1$) is 2 or more, each X$^1$ may be the same or different.

In the present invention, a compound represented by formula (II) is preferred as a compound represented by formula (I), and a compound represented by formula (IV) is preferred as a compound represented by formula (III).

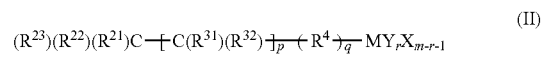

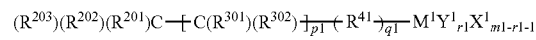

In formula (II) or (IV), M, X, m, M$^1$, X$^1$ and m$^1$ have the same meaning as above.

R$^{21}$ to R$^{23}$, R$^{201}$ to R$^{203}$, R$^{31}$, R$^{32}$, R$^{301}$, and R$^{302}$ are independently a hydrogen atom or fluorine atom.

R$^4$ and R$^{41}$ each independently represents an alkylene group, vinylene group, ethynylene group, arylene group, or a divalent linking group comprising a silicon atom and/or oxygen atom.

Specific examples of R$^4$ and R$^{41}$ are as follows:

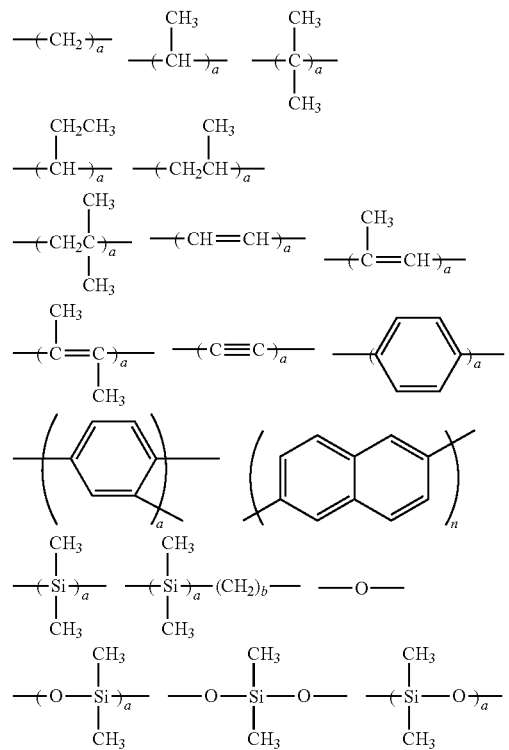

(wherein a and b represent any integer).

In the above formulae (II) and (IV), Y and $Y^1$ represent a hydrogen atom; alkyl group including methyl group, ethyl group, n-propyl group, isopropyl group, n-butyl group, isobutyl group, sec-butyl group, t-butyl group, n-pentyl group, isopentyl group, neopentyl group, t-pentyl group, n-hexyl group, and isohexyl group; alkoxy group including methoxy group, ethoxy group, n-propoxy group, isopropoxy group, n-butoxy group, sec-butoxy group, t-butoxy group, and n-pentyloxy group, n-hexyloxy group; fluorine-containing alkyl group wherein a part or all of the hydrogen atoms in the alkyl group is substituted with a fluorine atom; or fluorine-containing alkoxy group wherein a part or all of the hydrogen atoms in the alkoxy group is substituted with a fluorine atom; etc.

r represents 0 or a positive integer of 1 to (m−2), and $r^1$ represents 0 or a positive integer of 1 to ($m^1$−2). It is preferred that r and $r^1$ are 0 for producing an organic thin film of high density.

When r is 2 or more, each Y may be the same or different, and when (m−r−1) is 2 or more, each X may be the same or different. Further, when $r^1$ is 2 or more, each $Y^1$ may be the same or different, and when ($m^1$−$r^1$−1) is 2 or more, each $X^1$ may be the same or different. However, at least one of Y and X is a hydroxyl group or a hydrolysable group, and at least one of $Y^1$ and $X^1$ is a hydroxyl group or a hydrolysable group.

p and $p^1$ represent 0 or a positive integer, and q and $q^1$ represent 0 or 1. When p is 2 or more, the group represented by the formula: $C(R^{31})(R^{32})$ may be the same or different, and when $p^1$ is 2 or more, each group represented by the formula: $C(R^{301})(R^{302})$ may be the same or different.

Specific examples of the compounds represented by formulae (I) and (III) include the following. In the following, a compound wherein the metal atom is a silicon atom is shown as a representative example, while the present invention is not limited to these.

Specifically, the examples include the following, but are not limited to these: $CH_3(CH_2)_5Si(OCH_3)_3$, $CH_3(CH_2)_7Si(OCH_3)_3$, $CH_3(CH_2)_9Si(OCH_3)_3$, $CH_3(CH_2)_{11}Si(OCH_3)_3$, $CH_3(CH_2)_{13}Si(OCH_3)_3$, $CH_3(CH_2)_{15}Si(OCH_3)_3$, $CH_3(CH_2)_{17}Si(OCH_3)_3$, $CH_3(CH_2)_{19}Si(OCH_3)_3$, $CH_3(CH_2)_{21}Si(OCH_3)_3$, $CH_3(CH_2)_{17}Si(OCH_2CH_3)_3$, $CH_3(CH_2)_{17}SiCl_3$, $CH_3(CH_2)_9Si(OCH_2CH_3)_3$, $CH_3(CH_2)_9SiCl_3$, $CH_3(CH_2)_9Si(CH_3)(OCH_2CH_3)_2$, $CH_3(CH_2)_9Si(CH_3)(OCH_3)_2$, $CH_3(CH_2)_9Si(CH_3)_2(OCH_2CH_3)$, $CH_3(CH_2)_9Si(CH_3)_2(OCH_3)$, $CH_3CH_2O(CH_2)_{15}Si(OCH_3)_3$, $CF_3CH_2O(CH_2)_{15}Si(OCH_3)_3$, $CH_3(CH_2)_2Si(CH_3)_2(CH_2)_{15}Si(OCH_3)_3$, $CH_3(CH_2)_6Si(CH_3)_2(CH_2)_9Si(OCH_3)_3$, $CH_3COO(CH_2)_{15}Si(OCH_3)_3$, $CF_3(CF_2)_5(CH_2)_2Si(OCH_3)_3$, $CF_3(CF_2)_7$—$(CH=CH)_3$—$Si(OCH_3)_3$, $CH_3CH_2O(CH_2)_{15}Si(OC_2H_5)_3$, $CH_3(CH_2)_2Si(CH_3)_2(CH_2)_{15}Si(OC_2H_5)_3$, $CH_3(CH_2)_6Si(CH_3)_2(CH_2)_9Si(OC_2H_5)_3$, $CF_3(CH_2)_6Si(CH_3)_2(CH_2)_9Si(OC_2H_5)_3$, $CH_3COO(CH_2)_{15}Si(OC_2H_5)_3$, $CF_3COO(CH_2)_{15}Si(OC_2H_5)_3$, $CF_3COO(CH_2)_{15}Si(OCH_3)_3$, $CF_3(CF_2)_9(CH_2)_2Si(OC_2H_5)_3$, $CF_3(CF_2)_7(CH_2)_2Si(OC_2H_5)_3$, $CF_3(CF_2)_5(CH_2)_2Si(OC_2H_5)_3$, $CF_3(CF_2)_7(CH=CH)_3Si(OC_2H_5)_3$, $CF_3(CF_2)_9(CH_2)_2Si(OCH_3)_3$, $CF_3(CF_2)_5(CH_2)_2Si(OCH_3)_3$, $CF_3(CF_2)_7(CH_2)_2Si(CH_3)(OC_2H_5)_2$, $CF_3(CF_2)_7(CH_2)_2Si(CH_3)(OCH_3)_2$, $CF_3(CF_2)_7(CH_2)_2Si(CH_3)_2(OC_2H_5)$, $CF_3(CF_2)_7(CH_2)_2Si(CH_3)_2(OCH_3)$, $CF_3(CH_2)_2SiCl_3$, $CF_3(CF_2)_3(CH_2)_2SiCl_3$, $CF_3(CF_2)_5(CH_2)_2SiCl_3$, $CF_3(CF_2)_7(CH_2)_2SiCl_3$, $CF_3(CF_2)_3(CH_2)_3SiCl_3$, $CF_3(CF_2)_5(CH_2)_3SiCl_3$, $CF_3(CF_2)_7(CH_2)_3SiCl_3$, $CF_3(CF_2)_4O(CF_2)_2(CH_2)_2SiCl_3$, $CF_3(CF_2)_4O(CF_2)_2(CH_2)_3SiCl_3$, $CF_3(CF_2)_7(CH_2)_2O(CH_2)_3SiCl_3$, $CF_3(CF_2)_7CONH(CH_2)_2SiCl_3$, $CF_3(CF_2)_7CONH(CH_2)_3SiCl_3$, $CF_3(CF_2)_3O[CF(CF_3)CF(CF_3)O]_2CF(CF_3)CONH(CH_2)_3SiCl_3$, $CF_3(CF_2)_3(CH_2)_2Si(CH_3)Cl_2$, $CF_3CF_2)_5(CH_2)_2Si(CH_3)Cl_2$, $CF_3(CH_2)_2Si(CH_3)Cl_2$, $CF_3(CF_2)_3(CH_2)_3Si(CH_3)Cl_2$, $CF_3(CF_2)_5(CH_2)_3Si(CH_3)Cl_2$, $CF_3(CF_2)_7(CH_2)_3Si(CH_3)Cl_2$, $CF_3(CF_2)_4(CF_2)_2(CH_2)_2Si(CH_3)Cl_2$, $CF_3(CF_2)_4 (CF_2)_2(CH_2)_3Si(CH_3)Cl_2$, $CF_3(CF_2)_4(CH_2)_2O(CH_2)_3Si(CH_3)Cl_2$, $CF_3(CF_2)_7CONH(CH_2)_2Si(CH_3)Cl_2$, $CF_3(CF_2)_7CONH(CH_2)_3Si(CH_3)Cl_2$, $CF_3(CF_2)_3O[CF(CF_3)CF(CF_3)O]_2CF(CF_3)CONH(CH_2)_3Si(CH_3)Cl_2$, $CH_3(CH_2)_7SiCl_3$, $CH_3(CF_2)_7(CH_2)_2SiCl_3$, $CH_3(CF_2)_7(CH_2)_2Si(CH_3)Cl_2$, $CH_3 (CF_2)_7(CH_2)_2Si(OCH_3)_3$, $CH_3(CF_2)_7(CH_2)_2Si(NCO)_3$, $CH_3(CF_2)_8(CH_2)_2SiCl_3$, $CH_3(CF_2)_8(CH_2)_2Si(OCH_3)_3$, $CH_3(CF_2)_8(CH_2)_2Si(NCO)_3$, $CH_3(CF_2)_9(CH_2)_2SiCl_3$, $CH_3(CF_2)_9(CH_2)_2Si(OCH_3)_3$, $CH_3(CF_2)_9(CH_2)_2Si(NCO)_3$, $CH_3CH_2 (CF_2)_6(CH_2)_2SiCl_3$, $CH_3CH_2 (CF_2)_6(CH_2)_2Si(OCH_3)_3$, $CH_3CH_2CF_2)_6(CH_2)_2Si(NCO)_3$, $CH_3CH_2(CF_2)_8 (CH_2)_2SiCl_3$, $CH_3CH_2(CF_2)_8(CH_2)_2Si(OCH_3)_3$, $CH_3CH_2CF_2)_8(CH_2)_2Si(NCO)_3$, $CH_3CH_2 (CF_2)_{10}(CH_2)_2SiCl_3$, $CH_3(CF_2)_{40} (CF_2)_2(CH_2)_2SiCl_3$, $CH_3(CF_2)_7(CH_2)_2O(CH_2)_3SiCl_3$, $CH_3(CF_2)_8(CH_2)_2O(CH_2)_3SiCl_3$, $CH_3(CF_2)_9(CH_2)_2O(CH_2)_3SiCl_3$, $CH_3CH_2(CF_2)_6(CH_2)_2O(CH_2)_3SiCl_3$, $CH_3(CF_2)_6CONH(CH_2)_3SiCl_3$, $CH_3(CF_2)_8CONH(CH_2)_3SiCl_3$, $CH_3(CF_2)_3O[CF(CF_3)CF(CF_3)O]_2CF(CF_3)CONH(CH_2)_3SiCl_3$, $CH_3CH_2O(CH_2)_{15}Si(OCH_3)(OH)_2$, $CF_3CH_2O(CH_2)_{15}Si(OCH_3)_1(OH)_2$, $CH_3(CH_2)_2Si(CH_3)_2)$ $O(CH_2)_{15}Si(OCH_3)(OH)_2$, $CH_3(CH_2)_6Si(CH_3)_2(CH_2)_9Si(OCH_3)(OH)_2$, $CH_3COO(CH_2)_{15}Si(OCH_3)(OH)_2$, $CF_3(CF_2)_5(CH_2)_2Si(OCH_3)(OH)_2$, $CF_3(CF_2)_7(CH=CH)_3Si(OCH_3)(OH)_2$, $CH_3CH_2O(CH_2)_{15}Si(OC_2H_5)(OH)_2$, $CH_3(CH_2)_2Si(CH_3)_2(CH_2)_{15}Si(OC_2H_5)(OH)_2$, $CH_3(CH_2)_6Si(CH_3)_2(CH_2)_9Si(OC_2H_5)(OH)_2$, $CF_3(CH_2)_6Si(CH_3)_2(CH_2)_9Si(OC_2H_5)(OH)_2$, $CH_3COO(CH_2)_{15}Si(OC_2H_5)(OH)_2$, $CF_3COO(CH_2)_{15}Si(OC_2H_5)(OH)_2$, $CF_3COO(CH_2)_{15}Si(OCH_3)(OH)_2$, $CF_3(CF_2)_9(CH_2)_2Si(OC_2H_5)(OH)_2$, $CF_3(CF_2)_7(CH_2)_2Si(OC_2H_5)(OH)_2$, $CF_3(CF_2)_5(CH_2)_2Si(OC_2H_5)(OH)_2$, $CF_3(CF_2)_7(CH=CH)_3Si(OC_2H_5)(OH)_2$, $CF_3(CF_2)_9(CH_2)_2Si(OCH_3)(OH)CF_3(CF_2)_5(CH_2)_2Si(OCH_3)(OH)_2$, $CF_3(CF_2)_7(CH_2)_2Si(CH_3)(OH)_2$ $CF_3(CF_2)_9(CH_2)_2Si(CH_3)(OH)_2$, $CH_3CH_2O(CH_2)_{15}Si(OCH_3)_2$ (OH), $CF_3CH_2O(CH_2)_{15}Si(OCH_3)_2$ (OH), $CH_3(CH_2)_2Si(CH_3)_2(CH_2)_{15}Si(OCH_3)_2(OH)CH_3(CH_2)_6Si(CH_3)_2(CH_2)_9Si(OCH_3)_2(OH)$, $CH_3COO(C^H_2)_{15}Si(OCH_3)_2(OH)CF_3(CF_2)_5(CH_2)_2Si(OCH_3)_2(OH)$, $CH_3CH_2O(CH_2)_{15}SiOC_2H_5)_2(OH)CF_3(CF_2)_7(CH=CH)_3Si(OCH_3)_2$ (OH), $CH_3(CH_2)_2Si(CH_3)_2(CH_2)_{15}Si(OC_2H_5)_2(OH)CH_3(CH_2)_6Si(CH_3)_2(CH_2)_9Si(OC_2H_5)_2(OH)CF_3(CH_2)_6Si(CH_3)_2(CH_2)_9Si(OC_2H_5)_2$ (OH)$CH_3COO(CH_2)_{15}Si(OC_2H_5)_2$ (OH) $CF_3COO(C^H_2)_{15}Si(OC_2H_5)_2(OH)CF_3COO(CH_2)_{15}Si(OCH_3)_2(OH)CF_3(CF_2)_9(CH_2)_2Si(OC_2H_5)_2$ (OH)$CF_3(CF_2)_7(CH_2)_2Si(OC_2H_5)_2(OH)$, $CF_3(CF_2)_5(CH_2)_2Si(OC_2H_5)_2$ (OH)$CF_3(CF_2)_7(CH=CH)_3Si(OC_2H_5)_2(OH)CF_3(CF_2)_9(CH_2)_2Si(OCH_3)_2(OH)CF_3 (CF_2)_5(CH_2)_2S(OCH_3)_2(OH)CF_3(CF_2)_7(CH_2)_2Si(CH_3)(OC_2H_5)(OH)$, $CF_3(CF_2)_7(CH_2)_2Si(CH_3)(OCH_3)(OH)$, $CF_3(CH_2)_2Si(OCH_3)(OH)_2$, $CF_3(CF_2)_3(CH_2)_2Si(OCH_3)(OH)_2$, $CF_3(CF_2)_5(CH_2)_2Si(OCH_3)(OH)_2$, $CF_3(CF_2)_7(CH_2)_2Si(OCH_3)(OH)_2$, $CF_3(CF_2)_3(CH_2)_3Si(OCH_3)(OH)_2$, $CF_3(CF_2)_5(CH_2)_3Si(OCH_3)(OH)_2$, $CF_3(CF_2)_7(CH_2)_3Si(OCH_3)(OH)_2$, $CF_3(CF_2)_4O(CF_2)_2(CH_2)_2Si(OCH_3)(OH)_2$, $CF_3(CF_2)_4O(CF_2)_2(CH_2)_3Si(OCH_3)(OH)_2$, $CF_3(CF_2)_7(CH_2)_2O(CH_2)_3Si(OCH_3)(OH)_2$, $CF_3(CF_2)_7CONH(CH_2)_2Si(OCH_3)(OH)_2CF_3(CF_2)_7CONH(CH_2)_3Si(OCH_3)(OH)_2CF_3(CF_2)_3O[CF(CF_3)CF(CF_3)O]_2CF(CF_3)CONH(CH_2)_3Si(OCH_3)(OH)_2$, $CF_3(CH_2)_2Si(OCH_3)_2(OH)CF_3(CF_2)_3(CH_2)_2Si(OCH_3)_2$ (OH)$CF_3(CF_2)_5(CH_2)_2Si(OCH_3)_2(OH)CF_3(CF_2)_7(CH_2)_2Si(OCH_3)_2(OH)$ $CF_3(CF_2)_3(CH_2)_3Si(OCH_3)_2$ (OH)$CF_3(CF_2)_5(CH_2)_3Si(OCH_3)_2$ (OH)$CF_3(CF_2)_7(CH_2)_3Si(OCH_3)_2$ (OH), $CF_3(CF_2)_4O(CF_2)_2(CH_2)_2Si(OCH_3)_2(OH)CF_3(CF_2)_4O(CF_2)_2(CH_2)_3Si(OCH_3)_2$ (OH)$CF_3(CF_2)_7(CH_2)_2O(CH_2)_3Si(OCH_3)_2(OH)CF_3(CF_2)_7CONH(CH_2)_2Si(OCH_3)_2(OH)CF_3$ $(CF_2)_7CONH(CH_2)_3Si(OCH_3)_2(OH)CF_3(CF_2)_3O[CF(CF_3)CF(CF_3)O]_2CF(CF_3)CONH(CH_2)_3Si(OCH_3)_2(OH)CH_3(CH_2)_7Si(OCH_3)(OH)_2$, $CH_3(CF_2)_7(CH_2)_2Si(OCH_3)(OH)_2$, $CH_3(CF_2)_7(CH_2)_2Si(OCH_3)(OH)_2$, $CH_3(CF_2)_7(CH_2)_2Si(NCO)(OH)_2$, $CH_3(CF_2)_8(CH_2)_2Si(OCH_3)(OH)_2$, $CH_3(CF_2)_8(CH_2)_2Si(NCO)(OH)_2$, $CH_3(CF_2)_9(CH_2)_2Si(OCH_3)(OH)_2$, $CH_3(CF_2)_9(CH_2)_2Si(NCO)(OH)_2$, $CH_3CH_2(CF_2)_6(CH_2)_2Si(OCH_3)(OH)_2$, $CH_3CH_2(CF_2)_6(CH_2)_2Si(OCH_3)(OH)_2$, $CH_3CH_2(CF_2)_6(CH_2)_2Si(NCO)(OH)_2$, $CH_3CH_2(CF_2)_8(CH_2)_2Si(OCH_3)(OH)_2$, $CH_3CH_2(CF_2)_8(CH_2)_2Si(NCO)(OH)^2$, $CH_3CH_2(CF_2)_{10}(CH_2)_2Si(OCH_3)(OH)_2$, $CH_3(CF_2)_4O(CF_2)_2(CH_2)_2Si(OCH_3)(OH)_2$, $CH_3(CF_2)_7(CH_2)_2O(CH_2)_3Si(OCH_3)(OH)_2$, $CH_3(CF_2)_8(CH_2)_2O(CH_2)_3Si(OCH_3)(OH)_2$, $CH_3(CF_2)_9(CH_2)_2O(CH_2)_3Si(OCH_3)(OH)_2$, $CH_3CH_2(CF_2)_6(CH_2)_2O(CH_2)_3Si(OCH_3)(OH)_2$, $CH_3(CF_2)_6CONH(CH_2)_3Si(OCH_3)(OH)_2$, $CH_3(CF_2)_8CONH(CH_2)_3Si(OCH_3)(OH)_2CH_3(CF_2)_3O[CF(CF_3)CF(CF_3)O]_2CF(CF_3)CONH(CH_2)_3Si(OCH_3)(OH)_2$, $CF_3(CF_2)_3(CH_2)_2Si(CH_3)(OCH_3)(OH)CF_3(CF_2)_5(CH_2)_2Si(CH_3)(OCH_3)(OH)CF_3(CH_2)_2Si(CH_3)(OCH_3)(OH)CF_3(CF_2)_3(CH_2)_3Si(CH_3)(OCH_3)(OH)CF_3(CF_2)_5(CH_2)_3Si(CH_3)(OCH_3)(OH)CF_3(CF_2)_7(CH_2)_3Si(CH_3)(OCH_3)OH)$, $CF_3(CF_2)_4(CF_2)_2(CH_2)_2Si(CH_3)(OCH_3)(OH)CF_3(CF_2)_4(CF_2)_2(CH_2)_3Si(CH_3)(OCH_3)(OH)CF_3(CF_2)_4(CH_2)_2O(CH_2)_3Si(CH_3)(OCH_3)(OH)CF_3(CF_2)_7CONH(CH_2)_2Si(CH_3)(OCH_3)(OH)CF_3(CF_2)_7CONH(CH_2)_3Si(CH_3)(OCH_3)(OH)CF_3(CF_2)_3O[CF(CF_3)CF(CF_3)O]_2CF(CF_3)CONH(CH_2)_3Si(CH_3)(OCH_3)(OH)CH_3(CH_2)_7Si(OCH_3)_2(OH)CH_3$ $(CF_2)_7(CH_2)_2Si(OCH_3)_2(OH)CH_3(CF_2)_7(CH_2)_2Si(CH_3)(OCH_3)(OH)$, $CH_3(CF_2)_7(CH_2)_2Si(OCH_3)_2(OH)CH_3(CF_2)_7(CH_2)_2Si(NCO)_2(OH)(CF_2)_8(CH_2)_2Si(OCH_3)_2(OH)CH_3(CF_2)_8(CH_2)_2Si(NCO)_2(OH)CH_3(CF_2)_9(CH_2)_2Si(OCH_3)_2(OH)$ $CH_3(CF_2)_9(CH_2)_2Si(NCO)_2(OH)$, $CH_3CH_2(CF_2)_6(CH_2)_2Si(OCH_3)_2(OH)CH_3CH_2(CF_2)_6(CH_2)_2Si(OCH_3)_2(OH)$ $CH_3CH_2$ $(CF_2)_6(CH_2)_2Si(NCO)_2(OH)$, $CH_3CH_2$ $(CF_2)_8(CH_2)_2Si(OCH_3)_2(OH)$, $CH_3CH_2$ $(CF_z)_8(CH_2)_2Si(NCO)_2(OH)$, $CH_3CH_2$ $(CF_2)_{10}(CH_2)_2Si(OCH_3)_2(OH)$, $CH_3(CF_2)_{40}(CF_2)_2(CH_2)_2Si(OCH_3)_2(OH)CH_3(CF_2)_7(CH_2)_2O(CH_2)_3Si(OCH_3)_2(OH)CH_3(CF_2)_8(CH_2)_2O(CH_2)_3Si(OCH_3)_2(OH)$, $CH_3(CF_2)_9(CH_2)_2O(CH_2)_3Si(OCH_3)_2(OH)$, $CH_3CH_2(CF_2)_6(CH_2)_2O(CH_2)_3Si(OCH_3)_2(OH)CH_3(CF_2)_6CONH(CH_2)_3Si(OCH_3)_2(OH)$, $CH_3(CF_2)_8CONH(CH_2)_3Si(OCH_3)_2(OH)$, $CH_3(CF_2)_3O[CF(CF_3)CF(CF_3)O]_2CF(CF_3)CONH(CH_2)_3Si(OCH_3)_2(OH)$, $CH_3CH_2O(CH_2)_{15}Si(OH)_3$, $CF_3CH_2O(CH_2)_{15}Si(OH)_3$, $CH_3(CH_2)_2Si(CH_3)_2(CH_2)_{15}Si(OH)_3$, $CH_3(CH_2)_6Si(CH_3)_2(CH_2)_9Si(OH)_3$, $CH_3COO(CH_2)_{15}Si(OH)_3$, $CF_3(CF_2)_5(CH_2)_2Si(OH)_3$, $CF_3(CF_2)_7(CH=CH)_3Si(OH)_3$, $CH_3CH_2O(CH_2)_{15}Si(OH)_3$, $CH_3(CH_2)_2Si(CH_3)_2(CH_2)_{15}Si(OH)_3$, $CH_3(CH_2)_6Si(CH_3)_2(CH_2)_9Si(OH)_3CF_3(CH_2)_6Si(CH_3)_2(CH_2)_9Si(OH)_3$, $CH_3COO(CH_2)_{15}Si(OH)_3$, $CF_3COO(CH_2)_{15}Si(OH)_3$, $CF_3COO(CH_2)_{15}Si(OH)_3$, $CF_3(CF_2)(CH_2)_2Si(OH)_3$, $CF_3(CF_2)_7(CH_2)_2Si(OH)_3$, $CF_3CF_2)_5(CH_2)_2Si(OH)_3$, $CF_3(CF_2)_7(CH=CH)_3Si(OH)_3$, $CF_3(CF_2)_9(CH_2)_2Si(OH)_3$, $CF_3(CF_2)_5(CH_2)_2Si(OH)CF_3(CF_2)_7(CH_2)_2Si(CH_3)_2(OH)CF_3(CH_2)_2Si(OH)_3$, $CF_3(CF_2)_3(CH_2)_2Si(OH)_3$, $CF_3(CF_2)_5(CH_2)_2Si(OH)_3$, $CF_3(CF_2)_7(CH_2)_2Si(OH)_3$, $CF_3(CF_2)_3(CH_2)_3Si(OH)_3$, $CF_3$ $(CF_2)_5(CH_2)_3Si(OH)_3$, $CF_3$ $(CF_2)_7(CH_2)_3Si(OH)_3$, $CF_3$ $(CF_2)_4O(CF_2)_2(CH_2)Si_2(OH)_3$, $CF_3(CF_2)_4O(CF_2)_2(CH_2)_3Si(OH)_3$, $CF_3(CF_2)_7(CH_2)_2O(CH_2)_3Si(OH)_3$, $CF_3(CF_2)_7CONH(CH_2)_3Si(OH)_3$, $CF_3(CF_2)_7CONH(CH_2)_3Si(OH)_3$, $CF_3(CF_2)_3O[CF(CF_3)CF(CF_3)O]_2CF(CF_3)CONH(CH_2)_3Si(OH)_3$, $CH_3(CH_2)_7Si(OH)_3$, $CH_3(CF_2)_7(CH_2)_2Si(OH)_3$, $CH_3(CF_2)_7(CH_2)_2Si(OH)_3$, $CH_3(CF_2)_7(CH_2)_2Si(OH)_3$, $CH_3(CF_2)_8(CH_2)_2Si(OH)_3$, $CH_3(CF_2)_8(CH_2)_2Si(OH)_3$, $CH_3$ $(CF_2)_9(CH_2)_2Si(OH)_3$, $CH_3(CF_2)_9(CH_2)_2Si(OH)_3$, $CH_3CH_2(CF_2)_6(CH_2)_2Si(OH)_3$, $CH_3CH_2(CF_2)_6(CH_2)_2Si(OH)_3$, $CH_3CH_2(CF_2)_6(CH_2)_2Si(OH)_3$, $CH_3CH_2(CF_2)_8(CH_2)_2Si(OH)_3$, $CH_3CH_2(CF_2)_8(CH_2)_2Si(OH)_3$, $CH_3CH_2(CF_2)_{10}(CH_2)_2Si(OH)_3$, $CH_3(CF_2)_{40}(CF_2)_2(CH_2)_2Si(OH)_3$, $CH_3(CF_2)_2(CH_2)_2O(CH_2)_3Si(OH)_3$, $CH_3(CF_2)_8(CH_2)_2O(CH_2)_3Si(OH)_3$, $CH_3(CF_2)_9(CH_2)_2O(CH_2)_3Si(OH)_3$, $CH_3(CF_2)_9(CH_2)_2O(CH_2)_3Si(OH)_3$, $CH_3CH_2(CF_2)_6(CH_2)_2O(CH_2)_3Si(OH)_3$, $CH_3$ $(CF_2)_6CONH(CH_2)_3Si(OH)_3$, $CH_3(CF_2)_8CONH(CH_2)_3Si(OH)_3$, $CH_3(CF_2)_3O[CF(CF_3)CF(CF_3)O]_2CF(CF_3)CONH(CH_2)_3Si(OH)_3$, $CF_3(CF_2)_3(CH_2)_2Si(CH_3)(OH)_2$, $CF_3(CF_2)_5(CH_2)_2Si(CH_3)(OH)_2$, $CF_3(CH_2)_2Si(CH_3)(OH)_2$, $CF_3(CF_2)_3(CH_2)_3Si(CH_3)(OH)_2$, $CF_3(CF_2)_5(CH_2)_3Si(CH_3)(OH)_2$, $CF_3(CF_2)_7(CH_2)_3Si(CH_3)(OH)_2$, $CF_3(CF_2)_4(CF_2)_2(CH_2)_2Si(CH_3)(OH)_2$, $CF_3(CF_2)_4(CF_2)_2(CH_2)_3Si(CH_3)(OH)_2$, $CF_3(CF_2)_4(CH_2)_2O(CH_2)_3Si(CH_3)(OH)_2$, $CF_3(CF_2)_7CONH(CH_2)_2Si(CH_3)(OH)_2$, $CF_3(CF_2)_7CONH(CH_2)_3Si(CH_3)(OH)_2$, $CF_3(CF_2)_3O[CF(CF_3)CF(CF_3)O]_2CF(CF_3)CONH(CH_2)_3Si(CH_3)(OH)_2$, $CH_3(CF_2)_7(CH_2)_2Si(CH_3)(OH)$.

These compounds may be used alone, or by combining 2 or more of them.

(Compound (C) that can Interact with the Metal Surfactant)

The "compound (C) that can interact with the metal surfactant" used in the present invention is not particularly limited as long as it is a compound having an activity of activating the hydrolysable group or hydroxyl group, and promoting condensation by interacting via such as coordination bond or hydrogen bond with a metal moiety or hydrolysable group moiety of the metal surfactant (A).

In the present invention, as the above compound, it is preferred to use at least one kind of compound selected from the group consisting of metal hydroxide, metal alkoxides, partially hydrolyzed product of metal alkoxides, silanol condensation catalyst and acid catalyst is preferred, and it is more preferred to use at least one kind of compound selected from metal alkoxides and a partially hydrolyzed product of metal alkoxides.

The metal hydroxides are not particularly limited, and examples include $Ti(OH)_4$, $Zr(OH)_4$, and $Al(OH)_3$.

The metal alkoxides are not particularly limited, while at least one kind of metal alkoxides selected from the group consisting of titanium, zirconium, aluminum, silicon, iron, germanium, indium, tin, tantalum, zinc, tungsten, and lead is preferred from the view points of obtaining an organic thin film having an excellent transparency.

The carbon numbers of the alkoxy group of metal alkoxides are not particularly limited, while those with 1 to 4 carbons are preferred from the view points of concentration of the contained oxide, easiness of eliminating organic matters, and easiness to obtain.

Specific examples of metal alkoxides used in the present invention include: silicon alkoxides such as $Si(OCH_3)_4$, $Si(OC_2H_5)_4$, $Si(OC_3H_7$-$i)_4$, $Si(OC_4H_9$-$t)_4$; titanium alkoxides such as $Ti(OCH_3)_4$, $Ti(OC_2H_5)_4$, $Ti(OC_3H_7$-$i)_4$, $Ti(OC_4H_9)_4$; tetrakistrialkyl siloxytitanium such as $Ti[OSi(CH_3)_3]_4$, $Ti[OSi(C_2H_5)_3]_4$; zirconium alkoxides such as $Zr(OCH_3)_4$, $Zr(OC_2H_5)_4$, $Zr(OC_3H_7)_4$, $Zr(OC_4H_9)_4$; aluminum alkoxides such as $Al(OCH_3)_4$, $Al(OC_2H_5)_4$, $Al(OC_3H_7$-$i)_4$, $Al(OC_4H_9)_3$; germanium alkoxides such as $Ge(OC_2H_5)_4$; indium alkoxides such as $In(OCH_3)_3$, $In(OC_2H_5)_3$, $In(OC_3H_7$-$i)_3$, $In(OC_4H_9)_3$; tin alkoxides such as $Sn(OCH_3)_4$, $Sn(OC_2H_5)_4$, $Sn(OC_3H_7$-$i)_4$, $Sn(OC_4H_9)_4$; tantalum alkoxides such as $Ta(OCH_3)_5$, $Ta(OC_2H_5)_5$, $Ta(OC_3H_7$-$i)_5$, $Ta(OC_4H_9)_5$; tungsten alkoxides such as $W(OCH_3)_6$, $W(OC_2H_5)_6$, $W(OC_3H_7$-$i)_6$, $W(OC_4H_9)_6$; zinc alkoxides such as $Zn(OC_2H_5)_2$; lead alkoxides such as $Pb(OC_4H_9)_6$. These metal alkoxides may be used alone or by combining 2 or more of them.

Further, in the present invention, a complex alkoxide obtained by a reaction of 2 or more metal alkoxides; a complex alkoxide obtained by a reaction of 1 or more metal alkoxides with 1 or more metal salts; or a combination thereof may be used as metal alkoxides.

As a complex alkoxide obtained by a reaction of 2 or more metal alkoxides, a complex alkoxide obtained from a reaction of an alkoxide of alkaline metal or alkaline earth metal with an alkoxide of transition metal; and a complex alkoxide obtained in a form of complex salt by a combination of 3B elements can be exemplified.

Specific examples include $BaTi(OR)_6$, $SrTi(OR)_6$, $BaZr(OR)_6$, $SrZr(OR)_6$, $LiNb(OR)_6$, $LiTa(OR)_6$, or a combination thereof; reaction products of silicon alkoxides such as $LiVO(OR)_4$, $MgAl_2(OR)_8$, $(RO)_3SiOAl(OR')_2$, $(RO)_3SiOTi(OR')_3$, $(RO)_3SiOZr(OR')_3$, $(RO)_3SiOB(OR')_2$, $(RO)_3SiONb(OR')_4$, $(RO)_3SiOTa(OR')_4$, and the above metal alkoxides, and condensates thereof. Herein, R and R' represent an alkyl group, etc.

As a complex alkoxide obtained by a reaction of 1 or more metal alkoxides with 1 or more metal salts, a compound obtained by a reaction of metal salt and metal alkoxides can be exemplified.

As metal salts, chloride, nitrate, sulfate, acetate, formate, and oxalate can be exemplified. As metal alkoxides, the same as the above metal alkoxides can be exemplified.

Partially hydrolyzed product of metal alkoxides are products obtained before hydrolyzing completely metal alkoxides, and are present in the state of an oligomer.

The method for producing partially hydrolyzed products of metal alkoxides can be preferably exemplified by a method of hydrolyzing by using water within a mol range of 0.5 to less than 2.0-fold relative to the above exemplified metal alkoxides, at a temperature range of −100° C. to the reflux temperature of the organic solvent in an organic solvent.

Specific examples include:
(i) a method of adding water in an amount of 0.5 to less than 1.0-fold mol relative to metal alkoxides in an organic solvent;
(ii) a method of adding water in an amount of 1.0 to less than 2.0-fold relative to metal alkoxides, at a temperature below the temperature at which hydrolysis starts, preferably 0° C. or below, more preferably −20° C. to −100° C., in an organic solvent;
(iii) a method of adding water in an amount of 0.5 to less than 2.0-fold mol relative to metal alkoxides at room temperature, by controlling hydrolysis rate by a method of controlling the addition rate of water, or by a method of using an aqueous solution which water concentration has been lowered by adding a soluble solvent to water, in an organic solvent.

In the above method (i), reaction can be conducted after adding a certain amount of water at an arbitrary temperature, and then adding further water under a temperature condition of a temperature below the temperature at which hydrolysis starts, or preferably below −20° C.

A reaction of metal alkoxides and water can be performed by mixing directly metal alkoxides and water without using an organic solvent, but it is preferred to conduct the reaction in an organic solvent. Specifically, it can be conducted by either of a method of adding water diluted with an organic solvent to an organic solvent solution of metal alkoxides; a method of adding metal alkoxides or an organic solvent solution thereof to an organic solvent wherein water is suspended or dissolved. However, the former method of adding water afterwards is preferred.

The concentration of metal alkoxides in an organic solvent is not particularly limited as long as it is within a range that suppresses rapid heat generation, and that has a fluidity that allows stirring. Usually, it is within 5 to 30 wt %.

The reaction temperature of metal alkoxides and water in the above method (i) is not particularly limited, and it is usually within −100° C. to +100° C., and preferably within −20° C. to the boiling point of the organic solvent used, or of the alcohol detached by hydrolysis.

The temperature at which water is added in the above method (ii) is not particularly limited as long as it depends on the stability of metal alkoxides, and is below the temperature at which hydrolysis starts, or a temperature of below 0° C. However, it is preferred to add water to metal alkoxides within a temperature range of −50° C. to −100° C., for some of the types of metal alkoxides. Further, it is possible to add water at a low temperature, allow maturing for a certain time, hydrolyzing at room temperature to reflux temperature of the solvent used, and then performing dehydration-condensation reaction.

The reaction of metal alkoxides and water in the above method (iii) can be performed within a temperature range that is possible to cool down without using a particular cooling device, for example, from 0° C. to room temperature, by controlling the hydrolysis rate by a method other than temperature, for example by controlling the water adding rate. It is possible to allow maturing for a certain time, hydrolyzing at room temperature to reflux temperature of the solvent used, and then performing dehydration-condensation reaction.

As an organic solvent to be used, it is preferred that the hydrolyzed products of metal alkoxides may be dispersed as a dispersed material in the organic solvent, and a solvent which solubility to water is high and does not clot at a low temperature is more preferred, because the reaction of treating metal surfactant with water may be conducted at a low temperature.

Specific examples of organic solvent used include: alcoholic solvent such as methanol, ethanol, and isopropanol; halogenated hydrocarbonic solvent such as methylene chloride, chloroform, chlorobenzen; hydrocarbonic solvent such as hexane, cyclohexane, benzene, toluene, and xylene; ether solvent such as tetrahydrofuran, diethylether, and dioxane; ketone solvent such as acetone, methylethyl ketone, and methyl isobutyl ketone; amido solvent such as dimethylformamide and N-methylpyrrolidone; sulfoxide solvent such as dimethylsulfoxide; silicone such as methylpolysiloxane, octamethylcyclotetrasiloxane, decamethylcyclopentanesiloxane, and methylphenylpolysiloxane (Japanese Laid-Open Patent Application No. 9-208438).

These solvents may be used alone or by combining 2 or more of them.

When used as a mixed solvent, a combination of hydrocarbonic solvent such as toluene and xylene, and a lower alcohol solvent such as methanol, ethanol, isopropanol, and t-butanol is preferred. Herein, as a lower alcohol solvent, it is preferred to use an alcohol solvent of secondary alcohol or superior, such as isopropanol and t-butanol. The mixing ratio of the mixed solvent is not particularly limited, but it is preferred to use hydrocarbonic solvent and lower alcohol solvent within 99/1 to 50/50 as volume ratio.

The water used is not particularly limited as long as it is neutral, while it is preferred to use pure water, distilled water, or ion exchange water from the viewpoint of obtaining a dense organic thin film with less impurity.

The amount of water used, is 0.5 to less than 2.0-fold mol relative to 1 mol of the above metal alkoxides.

In a partial hydrolysis reaction of metal alkoxides with water, acid, base or dispersion stabilizer may be added. The acid or base is not particularly limited as long as it can function as a deflocculant that disperse again the precipitation formed by condensation; as a catalyst for producing a dispersed material such as colloid particles by performing hydrolysis and dehydration-condensation on metal alkoxides, and as a dispersion agent for the generated dispersed material.

Examples of the acid used include: mineral acid such as hydrochloric acid, nitric acid, boric acid, and fluoroboric acid; organic acids such as acetic acid, formic acid, oxalic acid, carbonic acid, trifluoroacetic acid, p-toluene sulfonic acid, and methanesulfonic acid; photoacid-generating agent which generates acid by light irradiation of diphenyliodonium hexafluorophosphate, triphenylphosphonium hexafluorophosphate, etc.

Examples of bases used include: triethanol amine, triethyl amine, 1,8-diazabicyclo[5.4.0]-7-undecene, ammonia, dimethylformamide, and phosphine.

A dispersion stabilizer is an agent having an effect of dispersing a dispersed agent stably in the dispersion medium, and include agents for preventing condensation such as deflocculant, protective colloid, and surfactant. Specific examples include a multilocus ligand compound having a strong chelating ability to multivalent carboxylic acid such as glycolic acid, gluconic acid, lactic acid, tartaric acid, citric acid, malic acid, and succinic acid; hydroxycarboxylic acid; phosphoric acid such as pyrophosphoric acid and tripolyphosphoric acid; metal atoms such as acetylacetone, methyl acetoacetate, ethyl acetoacetate, n-propyl acetoacetate, isopropyl acetoacetate, n-butyl acetoacetate, sec-butyl acetoacetate, t-butyl acetoacetate, 2,4-hexane-dione, 2,4-heptane-dione, 3,5-heptane-dione, 2,4-octane-dione, 2,4-nonane-dione, 5-methyl-hexane dione; aliphatic amines such as SULPERCE 3000, 9000, 17000, 20000, 24000 (Zeneca), Disperbyk-161, -162, -163, -164 (BYK), hydroxystearic acid, polyester amine; silicone compounds such as dimethylpolysiloxane-methyl(polysiloxy alkylene)siloxane copolymer, trimethylsiloxy silicic acid, carboxy denatured silicone oil, amine denatured silicon, etc. (Japanese Laid-Open Patent Application No. 9-208438; Japanese Laid-Open Patent Application No. 2000-53421).

The partially hydrolyzed product obtained as stated in the above is a dispersed material having a property of being dispersed stably without being agglutinated in the absence of acid, base and/or dispersion stabilizer in an organic solvent. Herein, a dispersed material relates to a microparticle dispersed in the dispersion system, and colloid particles can be specifically exemplified.

Herein, a state being stably dispersed without being agglutinated relates to a state wherein a dispersed material of a hydrolyzed product is not separated nonhomogeneously by being aggregated in an organic solvent, in the absence of acid, base, and/or dispersion stabilizer, and preferably to a state of being transparent and uniform.

Transparent relates to a state wherein the transmission in the light is high, and specifically it is related to a state wherein the spectral transmittance is preferably 80 to 100%, under the conditions where the concentration of a dispersed material is 0.5 wt % in terms of oxides, the light path length of quartz cell is 1 cm, and an organic solvent is used as a control sample, and the wave length of light is 550 nm.

The particle diameter of a dispersed material of the partially hydrolyzed product is not particularly limited, however it is usually 1 to 100 nm, preferably 1 to 50 nm, and more preferably 1 to 10 nm, in order to obtain a high transmittance in the visible light.

Examples of silanol condensation catalysts include: metal carboxylate, metal carboxylate ester, metal carboxylate polymer, metal chelate carboxylate, titanate ester, and titanate ester chelate. Specifically, stannous acetate, dibutyl tin dilaurate, dibutyl tin dioctate, dibutyl tin diacetate, dioctyl tin dilaurate, dioctyl tin dioctate, dioctyl tin diacetate, stannous dioctanoate, lead naphtenate, cobalt naphthenate, iron 2-ethylhexanoate, dioctyl tin bis octylthioglycolate ester, dioctyl tin maleate ester, dibutyl tin maleate polymer, dimethyl tin mercaptopropionate polymer, dibutyl tin bis acetyl acetate, dioctyl tin bis acetyl laurate, titanium tetraetoxide, titanium tetrabutoxide, titanium tetraisopropoxide, and titanium tis (acetyl acetonyl)dipropoxide can be exemplified.

Examples of acid catalysts include mineral acids such as hydrochloric acid, nitric acid, boric acid, and fluoroboric acid; organic acids such as acetic acid, formic acid, oxalic acid, carbonic acid, trifluoroacetic acid, p-toluene sulfonic acid, and methane sulfonic acid, and further include photoacid-generating agent which generates acid by photoirridation, which specific examples include diphenyliodonium hexafluorophosphate and triphenylphosphonium hexafluorophosphate.

(Preparation of an Adjuvant for Forming an Organic Thin Film)

The "adjuvant for forming an organic thin film" can be obtained by mixing a metal surfactant (A) with a compound (C) that can interact with the metal surfactant.

More specifically, the adjuvant for forming an organic thin film can be prepared by mixing a metal surfactant (A) and a compound (C) that can interact with the metal surfactant in an organic solvent with or without addition of water.

In the present invention, the metal surfactant (A) is contained in an amount of 0.5 to 80 wt %, preferably 5 to 50 wt % in the adjuvant for forming an organic thin film.

The compound (C) that can interact with the metal surfactant is contained in an amount of 0.1 ppm to 5 wt %, preferably 10 ppm to 2 wt % in terms of metal, when the compound is at least one type selected from the group consisting of metal hydroxide, metal alkoxides, partially hydrolyzed products of metal alkoxides, and silanol condensation catalyst. However, when it is an acid catalyst, it is contained in an amount of 0.001 mmol to 1 mol, preferably 0.01 mmol to 10 mmol per 1 mol of the metal surfactant [(A) and (B)].

The surfactant (A) is preferred to be 0.1 to 20 mol, more preferably 0.5 to 5.0 mol per 1 mol of the compound (C) that can interact with the metal surfactant.

The amount used of the compound (C) that can interact with the metal surfactant is less than the amount described in WO2006/009202.

The water used is 0.01 to 5.0 mol, preferably 0.1 to 2.0 mol per 1 mol of metal surfactant (A). However, it is not always necessary to add water, and moisture absorbed from air, or moisture contained in the material may be sufficient.

The reaction temperature is 0 to 100 C, and the reaction time is 1 hour to 10 days.

The method comprising adding water when mixing the metal surfactant (A) and a compound (C) that can interact with the metal surfactant in an organic solvent, specifically includes (i) a method comprising adding water in the organic solvent solution containing a metal surfactant (A) and a compound (C) that can interact with the metal surfactant; (ii) a method of adding a compound (C) that can interact with the metal surfactant to an organic solvent solution comprising a metal surfactant (A) and water. The compound that can interact with a metal surfactant is usually used in a state of organic solvent comprising water.

As for an organic solvent used for preparing the adjuvant for forming an organic thin film, hydrocarbonic solvent, fluorocarbonic solvent, and silicone solvent are preferred. Among these, those which boiling point is 100° C. to 250° C. are particularly preferred.

Specifically, hydrocarbonic solvents such as n-hexane, cyclohexane, benzene, toluene, xylene, petroleum naphtha, solvent naphtha, petroleum ether, petroleum benzin, isoparaffin, normal paraffin, decalin, industrial gasoline, kerosene, and ligroin; fluorocarbonic solvents such as fluorocarbon solvent such as $CBr_2ClCF_3$, $CClF_2CF_2CCl_3$, $CClF_2CF_2CHFCl$, $CF_3CF_2CHCl_2$, $CF_3CBrFCBrF_2$, $CClF_2CClFCF_2CCl_3$, $Cl(CF_2CFCl)_2Cl$, $Cl(CF_2CFCl)_2CF_2CCl_3$, $Cl(CF_2CFCl)_3Cl$, Fluorinert (3M), Afulude (Asahi Glass CO., Ltd.); and silicone solvents such as dimethyl silicone, phenyl silicone, alkyl-modified silicone, and polyether silicone; ketone solvent such as acetone, methylethyl ketone, methyl isobutyl ketone, diethyl ketone, dipropryl ketone, and dibutyl ketone; ethylene glycol ether solvent such as ethylene glycol dimethyl ether, ethylene glycol diethyl ether, ethylene glycol dibutyl ether, diethylene glycol diethyl ether, and diethylene glycol dibutyl ether can be exemplified. These solvents may be used alone or by combining 2 or more of them.

In order to suppress acute reaction, it is preferred that the water added in the method (i), and the compound (c) that can interact with the metal surfactant added in the method (ii) are diluted with an organic solvent, etc.

The adjuvant for forming an organic thin film obtained as in the above is preferred to be able to interact with the metal surfactant (B).

(Preparation of a Hydroxyl Group-Containing Solution)

The "hydroxyl group-containing solution" can be obtained from the above adjuvant for forming an organic thin film, and the metal surfactant (B). More specifically, by mixing and stirring the metal surfactant (B), organic solvent, adjuvant for forming an organic thin film and water, hydrolysis is performed to produce a hydroxyl group-containing compound. Thus, a hydroxyl group-containing solution can be obtained.

At that time, the total amount of the metal surfactants (A) and (B) is 0.1 to 80 wt %, preferably 0.5 to 50 wt % of the total hydroxyl group-containing solution, which is an amount of about 5 to 200-fold of that described in WO2006/009202.

Further, the ratio of the metal surfactants (A) and (B) is not particularly limited, while it is usually 1:10 to 50,000, preferably 1:150 to 20,000 in weight ratio.

The hydroxyl group-containing solution of the present invention is, more specifically, obtained by (a) a method of adding water to the organic solvent solution comprising the adjuvant for forming an organic thin film and the metal surfactant (B); (b) a method of adding the adjuvant for forming an organic thin film to the mixed solution containing the metal surfactant (B) and water. In order to suppress acute reaction, it is preferred that the water added in the method (a), and the adjuvant for forming an organic thin film added in the method (b) are diluted with an organic solvent, etc.

As an alternative method, when the metal surfactants (A) and (B) are the same, it is possible to mix a metal surfactant having at least 1 or more hydrolysable group, a compound (C) that can interact with the metal surfactant, and water, so that the amount of the metal surfactant becomes 0.1 wt % to 80 wt %, thereby preparing the hydroxyl group containing solution with a hydroxyl group-containing compound generated by hydrolysis, without preparing the adjuvant for forming an organic thin film previously.

As for organic solvents used for preparing a hydroxyl group-containing solution of the present invention, a hydrocarbonic solvent, fluorocarbonic solvent, and silicone solvent are preferred. Among these, those which boiling point is 100° C. to 250° C. are particularly preferred. Specifically, similar solvents as the hydrocarbonic solvents, fluorocarbonic solvents, and silicone solvents which have been listed as usable for preparing the adjuvant for forming an organic thin film may be used.

The amount of water used for preparing the hydroxyl group-containing solution of the present invention may be appropriately determined according to the types of the used metal surfactant (B), adjuvant for forming an organic thin film, and the substrate to which the film is to be coated.

The stirring temperature of a mixture of the metal surfactant (B), organic solvent, adjuvant for forming the organic thin film, and water is usually −100° C. to +100° C., preferably −20° C. to +50° C. The stirring time is usually 1 hour to 100 days.

In that case, in order to obtain an uniform solution for forming an organic thin film, it is also preferred to perform an ultrasonic treatment.

Sometimes, precipitates containing metal hydroxides are generated in the prepared hydroxyl group-containing solution. It is preferred to remove the impurities such as these precipitates at this stage, in order to obtain a dense monomolecular organic thin film without impurities. The precipitates can be easily removed by operations such as filtration and decant.

In the present invention, as a hydroxyl group-containing solution, a solution which water content has been adjusted or maintained within a certain range is used. The water content is preferred to be within a range by which problems such as the chemisorption to the substrate surface is inhibited, a dense monomolecular film cannot be produced, the amount of the metal surfactant that can be effectively used is lost, or the catalyst is inactivated do not arise. When allowing the substrate to contact with the solution by dipping method, the contact time is within 10 min, preferably within 5 min, and in order to form a dense and uniform organic thin film at once, and on the front surface of the substrate to which the solution has been in contact, it is possible to promote and activate the formation of the film on the substrate surface.

(Preparation of the Solution for Forming an Organic Thin Film)

At the time the hydroxyl group-containing compounds increase with the progress of the hydrolysis reaction, and the concentration of the hydroxyl group achieves equilibrium, the final solution for forming an organic thin film is adjusted by diluting the solution with an organic solvent to 1.5 to 200-fold, preferably 2 to 100-fold, and more preferably 10 to 50-fold. The time period for that the concentration of the hydroxyl group achieves equilibrium is not particularly limited, but is 1 hour to 1 month, preferably 1 to 2 weeks.

Herein, the state where the concentration of the hydroxyl group achieves equilibrium can be confirmed by reverse HPLC by using a metal surfactant before hydrolysis, for example, octadecyltrimethoxysilane as a standard, and measuring over time the peaks of the position corresponding to monosilanol.

At the time the hydroxyl group-containing compounds increase with the progress of hydrolysis reaction, and the concentration of the hydroxyl group achieves equilibrium, the conversion ratio of the starting material metal surfactant to a hydroxyl group-containing compound is 5 to 50 wt %, preferably 8 wt % to 30 wt %.

The total starting amount of the metal surfactants (A) and (B) relative to the total solution for forming an organic thin film after dilution is 0.05 wt % to 50 wt %, preferably 0.1 to 10 wt %. The amount of the hydroxyl group-containing compound generated with the progress of hydrolosys is 20 ppm to 6 wt %, preferably 50 ppm to 1 wt %. The amount of the compound (C) that can interact with the metal surfactant is 0.01 ppm to 8 ppm, preferably 0.03 ppm to 2 ppm in terms of metal, when it is at least 1 type selected from the group consisting of metal hydroxide, metal alkoxides, partially hydrolyzed product of metal alkoxides and silanol condensation catalyst.

The water content of the solution for forming an organic thin film is 10 ppm to 2000 ppm, and it may be a water amount as less as 10 to less than 50 ppm.

Herein, the water amount is a level obtained by measuring with Karl-Fisher method by harvesting a part of the organic solvent solution. The measuring device is not particularly limited as long as the level is a level measured with a device by using the method doctrine.

As a method for adjusting or maintaining the water content of the solution for forming an organic thin film to result in a predetermined amount, (i) a method of providing a water layer by allowing to contact with the solution for forming an organic thin film, (ii) a method of allowing a water-retentive material containing water to coexist; and (iii) a method of injecting gas containing moisture, can be exemplified.

As an organic solvent to be added after preparing a hydroxyl group-containing solution, a similar solvent as that used when preparing the hydroxyl group-containing solution can be used. In that case, the same or a different solvent may be used.

The solution for forming an organic thin film of the present invention has an excellent preservation stability, and it can form an excellent organic thin film even after a tightly sealed-storage for 40 to 60 days, at room temperature (20° C. to 30° C.). Specifically, as for the solution for forming an organic thin film of the present invention, the remaining level of the contained metal surfactant reduces slowly with the passage of time after preparation, while the production level of the hydroxyl group-containing compound is almost constant.

The reaction to generate a hydroxyl group-containing compound by the hydrolysis of the metal surfactant is an equilibrium reaction, and some of the hydroxyl group-containing compounds dehydrate and condensate to become high molecular with the passage of time, and it is considered that the metal surfactant hydrolyses in an amount corresponding to the consumed amount of the hydroxyl group-containing compound, to generate a hydroxyl group-containing compound. Further, when using the storage solution of the solution for forming an organic thin film, an excellent organic thin film can be formed. Thus, it can be considered that a high molecule (or oligomer) obtained by dehydration and condensation of a hydroxyl group-containing compound does not affect the formation of the organic thin film.

(Method for Forming an Organic Thin Film)

According to a method for forming an organic thin film of the present invention, an organic thin film is formed on the substrate surface by allowing the substrate to contact with the solution for forming an organic thin film thus obtained.

As a substrate to be used, a substrate having an active hydrogen on the surface is preferred. Specifically, substrates made of metal such as aluminum, copper and stainless; ceramics; glass; plastic; paper; natural fiber or synthetic fiber; leather; and other hydrophilic materials can be exemplified.

When a substrate that does not have a hydroxyl group or the like on the surface is used, it is also possible to treat the substrate surface previously in a plasma atmosphere containing oxygen, or to introduce a hydrophilic group by a corona treatment. The hydrophilic group is preferably a hydroxyl group (—OH), but may be a functional group having an active hydrogen, such as —COOH, —CHO, =NH, and —NH$_2$.

Further, when a substrate that does not have an active hydrogen on the surface is used, it is also possible to allow the substrate surface to contact previously with at least one compound selected from the group consisting of SiCl$_4$, SiHCl$_3$, SiH$_2$Cl$_2$, Cl—(SiCl$_2$O)$_c$—SiCl$_3$ (wherein c is or a positive integer), and then to conduct a dehydrochlorination reaction to form a silica basic layer having an active hydrogen on the surface.

The method to allow the substrate surface to contact with the solution for forming an organic thin film of the present invention (hereinafter abbreviated as "solution of the present invention") is not particularly limited, and a known method can be used. Specific examples include, dipping method, spin coating method, spraying method, roller coat method, Mayer bar method, screen printing method, and brush coating method. Among these, dipping method is preferred.

The contact temperature of the solution of the present invention and the substrate surface is not particularly limited as long as it is a range within which the solution of the present invention can maintain stability. Usually, it may be performed within the range from room temperature to the reflux temperature of the solvent used for preparing the solution. In order to obtain a suitable temperature for contact, the solution of the present invention may be heated, or the substrate itself may be heated.

Further, ultrasonic waves may be used to promote film formation. The step of allowing the substrate surface to contact with the solution of the present invention may be conducted at one time for a long time, or a brief coating may be conducted several times.

After allowing the substrate surface to contact with the solution of the present invention, a washing step may be provided in order to remove extra reagent, impurities, etc. attached to the film surface. By providing a washing step, the film thickness can be more controlled. The washing method is not particularly limited as long it is a method by which the attached materials on the surface can be removed. Specifically, a method of immersing a substrate in a solvent that may dissolve the used metal surfactant; a method of allowing evaporation by leaving stand in vacuum or under normal pressure; a method of blowing off by spraying inactive gas such as dried nitrogen gas, can be exemplified.

It is preferred to heat the substrate after allowing the substrate to contact with the solution of the present invention, or washing the solution of the present invention, in order to stabilize the film formed on the substrate surface. The heating temperature may be appropriately selected according to the substrate, or stability of the formed organic thin film, etc.

(Organic Thin Film)

When the solution of the present invention is coated on the substrate, the metal surfactant in the solution is adsorbed on the substrate surface, and a thin film is formed. The mechanism by which the metal surfactant is adsorbed on the substrate surface is not clear, while it can be considered as follows when it is a case of a substrate having an active hydrogen on the surface. Specifically, in the solution for forming an organic thin film, the hydrolysable group of the metal surfactant is hydrolyzed with water. The metal surfactant of that state reacts with the active hydrogen on the substrate surface and a thin film if formed by forming a strong chemical bond with the substrate. The thin film is formed by reacting with the active hydrogen of the substrate, and becomes a monomolecular film.

By using a solution for forming an organic thin film obtained by using a metal surfactant (B) shown by the above formula (IV), an organic thin film which is oil repellant and water repellant before light irradiance can be formed on the substrate surface. More specifically, an organic thin film which contact angle with water before light irradiance is preferably 80° or more, more preferably 85° or more, most preferably 90° or more, and particularly preferably 100° or more, and which contact angle with toluene is 20° or more, can be formed. The organic thin film changes into a hydrophilic thin film which contact angle with water is less than 80° by light irradiance.

The method for forming an organic thin film of the present invention may be used for producing a monomolecular film, as well as for producing a multilayer film with 2 or more layers. Particularly, it may be used suitably for producing a monomolecular film. Further, it may be used as a method for forming a film on the surface by a physical adsorption.

The organic thin film formed by the method for forming an organic thin film of the present invention is not particularly limited, while it is preferred to be a crystalline organic thin film. The crystalline property of the organic thin film formed by the method for forming an organic thin film of the present invention can be confirmed by measuring the film with a thin film X-ray diffraction device.

The film thickness of the organic thin film formed by the method for forming an organic thin film of the present invention is not particularly limited, and it is a monomolecular film of 1 to 5 nm, preferably 1.5 to 2.5 nm.

The organic thin film formed by the method of forming an organic thin film of the present invention is preferably a chemisorbed film, and it is more preferred that the chemisorbed film has a crystalline property. In that case, the crystalline property may be multicrystal, or monocrystal. As a chemisorbed film, an organic thin film covalently bond via metal-oxygen bond can be exemplified.

The organic thin film formed by a method for forming an organic thin film of the present invention is preferred to be a self-assembled film. Herein, a self-assembled film relates to a film having a methodical structure without external forcing. Molecules forming a self-assembled film are obtained from a metal surfactant used for preparing a solution for forming a self-assembled film. Molecules of a metal surfactant do not exist independently by being solvated by a solvent in a solution for forming a self-assembled film, but several molecules are assembled to form an aggregate.

The form of the aggregate may be a form wherein molecules are assembled by intermolecular force, coordination bond, or hydrogen bond of the hydrophobic moieties, or of the hydrophilic moieties; a form wherein the molecules forming a film are assembled by being bound by covalent bond; a form wherein the other media such as water form a micelle as a nucleus or an intermediate; or a combination of these.

The shape of the aggregate is not particularly limited and it may be in a shape of sphere, chain, band, etc. The average particle diameter of the aggregate is not particularly limited, and the range of 10 to 1000 nm is preferred.

The level of zeta potential (electrokinetic potential) of the aggregate is preferred to be greater than the level of zeta potential of the substrate in the same solvent. It is particularly preferred that the zeta potential of the aggregate is positive, and the zeta potential of the substrate is negative. By using a solution for forming a self-assembled film forming an aggregate having such zeta potential, a dense monomolecular film having a crystalline property can be produced.

As it is stated in the above, by using the method of the present invention, a dense organic thin film with less impurity can be formed at a higher speed compared to the conventional metal surfactant regardless of the type of substrate. Such organic thin films are used for forming design pattern of electric devices, etc. and can be very easily applied for equipments which require a heat-resistant, weather-resistant, and abrasion-resistant ultra thin film coating, such as electrical appliances, car, industrial devices, mirror, optical lenses, etc.

EXAMPLES

The present invention will be further explained in detail in the following by referring to the Examples, while the present invention will not be limited to the following Examples.

Preparation of an Adjuvant for Forming an Organic Thin Film

Example 1-1

16.1 g (43.0 mmol) of octadecyltrimethoxysilane (Gelest; purity: 95%) was put into a 200 ml-four neck-flask at room temperature, 4.6 g (16.4 mmol) of tetraisopropoxytitanium (Nippon Soda) was added, and the mixture was diluted by adding 77.6 g of toluene.

1.7 g of distilled water was added to this solution at 25° C., allowed to react at room temperature for 24 hours to obtain the adjuvant for forming an organic thin film A.

Example 1-2

16.1 g (43.0 mmol) of octadecyltrimethoxysilane (Gelest; purity: 95%) was put into a 200 ml-four neck-flask at room temperature, 5.7 g (16.4 mmol) of tetrabutoxytitanium (Nippon Soda) was added, and the mixture was diluted by adding 76.5 g of toluene.

1.7 g of distilled water was added to this solution at 25° C., allowed to react at room temperature for 24 hours to obtain the adjuvant for forming an organic thin film B.

Example 1-3

16.1 g (43.0 mmol) of octadecyltrimethoxysilane (Gelest; purity: 95%) was put into a 200 ml-four neck-flask at room temperature, 6.9 g (16.4 mmol) of tetrabutoxyzirconium (Nippon Soda) was added, and the mixture was diluted by adding 75.3 g of toluene.

1.7 g of distilled water was added to this solution at 25° C., allowed to react at room temperature for 24 hours to obtain the adjuvant for forming an organic thin film C.

Example 1-4

16.1 g (43.0 mmol) of octadecyltrimethoxysilane (Gelest; purity: 95%) was put into a 200 ml-four neck-flask at room temperature, 4.6 g (16.4 mmol) of tetraisopropoxytitanium (Nippon Soda) was added, and the mixture was diluted by adding 77.6 g of Sorbesso 150 (Exxon Mobil).

1.7 g of distilled water was added to this solution at 25° C., allowed to react at room temperature for 24 hours to obtain the adjuvant for forming an organic thin film D.

Example 1-5

17.9 g (68.2 mmol) of decyltrimethoxysilane (Gelest; purity: 95%) was put into a 200 ml-four neck-flask at room temperature, 7.3 g (25.9 mmol) of tetraisopropoxytitanium (Nippon Soda) was added, and the mixture was diluted by adding 72.1 g of toluene.

2.7 g of distilled water was added to this solution at 25° C., allowed to react at room temperature for 24 hours to obtain the adjuvant for forming an organic thin film E.

Example 1-6

16.4 g (47.5 mmol) of hexadecyltrimethoxysilane (Gelest; purity: 95%) was put into a 200 ml-four neck-flask at room temperature, 5.1 g (18.1 mmol) of tetraisopropoxytitanium (Nippon Soda) was added, and the mixture was diluted by adding 76.6 g of toluene.

1.9 g of distilled water was added to this solution at 25° C., allowed to react at room temperature for 24 hours to obtain the adjuvant for forming an organic thin film F.

Example 1-7-1

Synthesis of Hydrolysis Solution of Alkoxytitanium 130 g (0.46 mol) of tetraisopropoxytitanium (Nippon Soda) and 481 g of dehydrated toluene (water content: 3.6 ppm) were put into a reaction vessel comprising a mixer, and the mixture was cooled down to −40° C. by using a freezing mixture consisting of dry ice and denatured alcohol.

To this solution, 12.4 g (0.69 mol) of distilled water and 112 g of dehydrated isopropanol (water content: 17 ppm) were added into a dropping funnel which content is coolable. The mixture was cooled down to −40° C. to −35° C. by using a freezing mixture consisting of dry ice and denatured alcohol, and the reaction was conducted by dropping over 1.5 hours at an inner temperature of −40° C. to −35° C. Then, the mixture was allowed to mature for 1 hour at the same temperature (−40° C. to −35° C.) and heated to ordinary temperature, allowed to mature for 2 hours at ordinary temperature, and refluxed by heating for 2 hours. Then, the reaction solution was cooled down to ordinary temperature, to obtain a hydrolyzed polymer solution of tetraisopropoxytitanum without any turbidness.

Example 1-7-2

16.1 g (43.0 mmol) of octadecyltrimethoxysilane (Gelest; purity: 95%) was put into a 200 ml-four neck-flask at room temperature, 26.1 g (16.4 mmol) of the hydrolyzed polymer solution of tetraisopropoxytitanium was added, and the mixture was diluted by adding 56.0 g of toluene.

1.7 g of distilled water was added to this solution at 25° C., allowed to react at room temperature for 24 hours to obtain the adjuvant for forming an organic thin film G.

Example 1-8

16.1 g (43.0 mmol) of octadecyltrimethoxysilane (Gelest; purity: 95%) was put into a 200 ml-four neck-flask at room temperature, 2.6 g (32.8 mmol) of titanium hydroxide (fine powder) was added, and the mixture was diluted by adding 79.6 g of toluene. 1.7 g of distilled water was added to this solution at 25° C., allowed to react at room temperature for 24 hours to obtain the adjuvant for forming an organic thin film H.

Example 1-9

16.1 g (43.0 mmol) of octadecyltrimethoxysilane (Gelest; purity: 95%) was put into a 200 ml-four neck-flask at room temperature, 4.3 g (16.4 mmol) of titanyl (IV) acetylacetonate (Kanto Chemical) was added, and the mixture was diluted by adding 77.9 g of toluene.

1.7 g of distilled water was added to this solution at 25° C., allowed to react at room temperature for 24 hours to obtain the adjuvant for forming an organic thin film I.

Example 1-10

16.1 g (43.0 mmol) of octadecyltrimethoxysilane (Gelest; purity: 95%) was put into a 200 ml-four neck-flask at room temperature, 4.2 g (16.4 mmol) of iron(II) acetylacetonate (Aldrich) was added, and the mixture was diluted by adding 78.0 g of toluene.

1.7 g of distilled water was added to this solution at 25° C., allowed to react at room temperature for 24 hours to obtain the adjuvant for forming an organic thin film J.

Example 1-11

7.6 g (10.2 mmol) of dimer synthesized from octadecyltrimethoxysilane (Gelest; purity: 95%) was put into a 100-ml four neck-flask at room temperature, 2.3 g (8.2 mmol) of tetraisopropoxytitanium (Nippon Soda) was added, and the mixture was diluted by adding 39.6 g of toluene. 0.6 g of distilled water was added to this solution at 25° C., allowed to react at room temperature for 24 hours to obtain the adjuvant for forming an organic thin film K.

Preparation of a Hydroxyl Group-Containing Solution

Example 2-1

78.9 g (200 mmol) of octadecyltrimethoxysilane (Gelest; purity: 95%) was put into a 1000-ml four neck-flask at room temperature, 0.16 g of the adjuvant for forming an organic thin film A was added, and the mixture was diluted by adding 419 g of toluene.

3.7 g of distilled water was added to this solution, allowed to react at room temperature for 10 days to obtain the hydroxyl group-containing solution A.

Example 2-2

276.2 g (700 mmol) of octadecyltrimethoxysilane (Gelest; purity: 95%) was put into a 1000-ml four neck-flask at room temperature, 0.16 g of the adjuvant for forming an organic thin film A was added, and the mixture was diluted by adding 211 g of toluene.

13.0 g of distilled water was added to this solution, allowed to react at room temperature for 10 days to obtain the hydroxyl group-containing solution B.

Example 2-3

6.3 g (16.0 mmol) of octadecyltrimethoxysilane (Gelest; purity: 95%) was put into a 1000-ml four neck-flask at room temperature, 0.16 g of the adjuvant for forming an organic thin film A was added, and the mixture was diluted by adding 493 g of toluene.

0.3 g of distilled water was added to this solution, allowed to react at room temperature for 10 days to obtain the hydroxyl group-containing solution C.

Example 2-4

78.9 g (200 mmol) of octadecyltrimethoxysilane (Gelest; purity: 95%) was put into a 1000-ml four neck-flask at room temperature, 1.6 g of the adjuvant for forming an organic thin film A was added, and the mixture was diluted by adding 416 g of toluene.

3.7 g of distilled water was added to this solution, allowed to react at room temperature for 5 days to obtain the hydroxyl group-containing solution D.

Example 2-5

78.9 g (200 mmol) of octadecyltrimethoxysilane (Gelest; purity: 95%) was put into a 1000-ml four neck-flask at room temperature, 0.03 g of the adjuvant for forming an organic thin film A was added, and the mixture was diluted by adding 417 g of toluene.
3.7 g of distilled water was added to this solution, allowed to react at room temperature for 30 days to obtain the hydroxyl group-containing solution E.

Example 2-6

78.9 g (200 mmol) of octadecyltrimethoxysilane (Gelest; purity: 95%) was put into a 1000-ml four neck-flask at room temperature, 0.16 g of the adjuvant for forming an organic thin film B was added, and the mixture was diluted by adding 419 g of toluene.
3.7 g of distilled water was added to this solution, allowed to react at room temperature for 10 days to obtain the hydroxyl group-containing solution F.

Example 2-7

78.9 g (200 mmol) of octadecyltrimethoxysilane (Gelest; purity: 95%) was put into a 1000-ml four neck-flask at room temperature, 0.16 g of the adjuvant for forming an organic thin film C was added, and the mixture was diluted by adding 419 g of toluene.
3.7 g of distilled water was added to this solution, allowed to react at room temperature for 10 days to obtain the hydroxyl group-containing solution G.

Example 2-8

78.9 g (200 mmol) of octadecyltrimethoxysilane (Gelest; purity: 95%) was put into a 1000-ml four neck-flask at room temperature, 0.16 g of the adjuvant for forming an organic thin film D was added, and the mixture was diluted by adding 419 g of Sorbesso 150.
3.7 g of distilled water was added to this solution, allowed to react at room temperature for 10 days to obtain the hydroxyl group-containing solution H.

Example 2-9

55.2 g (200 mmol) of decyltrimethoxysilane (Gelest; purity: 95%) was put into a 1000-ml four neck-flask at room temperature, 0.16 g of the adjuvant for forming an organic thin film E was added, and the mixture was diluted by adding 441 g of toluene.
3.7 g of distilled water was added to this solution, allowed to react at room temperature for 10 days to obtain the hydroxyl group-containing solution I.

Example 2-10

72.8 g (200 mmol) of hexadecyltrimethoxysilane (Gelest; purity: 95%) was put into a 1000-ml four neck-flask at room temperature, 0.16 g of the adjuvant for forming an organic thin film F was added, and the mixture was diluted by adding 423 g of toluene.

3.7 g of distilled water was added to this solution, allowed to react at room temperature for 10 days to obtain the hydroxyl group-containing solution J.

Example 2-11

78.9 g (200 mmol) of octadecyltrimethoxysilane (Gelest; purity: 95%) was put into a 1000-ml four neck-flask at room temperature, 0.16 g of the adjuvant for forming an organic thin film G was added, and the mixture was diluted by adding 419 g of toluene.
3.7 g of distilled water was added to this solution, allowed to react at room temperature for 10 days to obtain the hydroxyl group-containing solution K.

Example 2-12

78.9 g (200 mmol) of octadecyltrimethoxysilane (Gelest; purity: 95%) was put into a 1000-ml four neck-flask at room temperature, 0.16 g of the adjuvant for forming an organic thin film I was added, and the mixture was diluted by adding 419 g of toluene.
3.7 g of distilled water was added to this solution, allowed to react at room temperature for 10 days to obtain the hydroxyl group-containing solution L.

Example 2-13

78.9 g (200 mmol) of octadecyltrimethoxysilane (Gelest; purity: 95%) was put into a 1000-ml four neck-flask at room temperature, 0.16 g of the adjuvant for forming an organic thin film J was added, and the mixture was diluted by adding 419 g of toluene.
3.7 g of distilled water was added to this solution, allowed to react at room temperature for 10 days to obtain the hydroxyl group-containing solution M.

Example 2-14

78.9 g (200 mmol) of octadecyltrimethoxysilane (Gelest; purity: 95%) was put into a 1000-ml four neck-flask at room temperature, 0.16 g of the adjuvant for forming an organic thin film H was added, and the mixture was diluted by adding 419 g of toluene.
3.7 g of distilled water was added to this solution, allowed to react at room temperature for 10 days to obtain the hydroxyl group-containing solution N.

Example 2-15

15.8 g of a mixture of ODS-monomer-dimer-trimer (weight ratio=63.9:31.3:4.8) synthesized from octadecyltrimethoxysilane (Gelest; Purity: 95%) was put into a 200 ml-four neck-flask at room temperature, 0.03 g of the adjuvant for forming an organic thin film A was added, and the mixture was diluted by adding 83 g of toluene. 0.7 g of distilled water was added to this solution, allowed to react at room temperature for 10 days to obtain the hydroxyl group-containing solution P.

Example 2-16

14.8 g of ODS-dimer synthesized from octadecyltrimethoxysilane (Gelest; Purity: 95%) was put into a 200 ml-four neck-flask at room temperature, 0.03 g of the adjuvant for forming an organic thin film K was added, and the mixture was diluted by adding 85 g of toluene.

0.7 g of distilled water was added to this solution, allowed to react at room temperature for 10 days to obtain the hydroxyl group-containing solution Q.

Example 2-17

14.5 g of ODS-trimer synthesized from octadecyltrimethoxysilane (Gelest; Purity: 95%) was put into a 200 ml-four neck-flask at room temperature, 0.03 g of the adjuvant for forming an organic thin film A was added, and the mixture was diluted by adding 85 g of toluene.
0.7 g of distilled water was added to this solution, allowed to react at room temperature for 10 days to obtain the hydroxyl group-containing solution R.

Example 2-18

78.9 g (200 mmol) of octadecyltrimethoxysilane (Gelest; Purity: 95%) was put into a 1000 ml-four neck-flask at room temperature, diluted by adding 419 g of THF. 6.6 g of 0.003N chloride was added, and the mixture was allowed to react at room temperature for 10 days, to obtain the solution for forming an organic thin film O before dilution.

Example 2-19

6.45 kg (16.4 mol) of octadecyltrimethoxysilane (Gelest; purity: 95%) was put into a 100 L-reaction vessel at room temperature, 1.4 g (4.03 mmol) of tetrabutoxytitanium (Nippon Soda) was added, and diluted by adding 33.5 kg of toluene.
300 g of distilled water was added to this solution, allowed to react for 10 days at room temperature, to obtain the hydroxyl group-containing solution S.

Preparation of a Solution for Forming an Organic Thin Film

Example 3-1

20 g of the hydroxyl group-containing solution A was put into a 1000 ml-four neck-flask at room temperature, and diluted by adding 480 g of toluene to obtain the solution for forming an organic thin film A.

Example 3-2

200 g of the hydroxyl group-containing solution A was put into a 1000 ml-four neck-flask at room temperature, and diluted by adding 300 g of toluene to obtain the solution for forming an organic thin film B.

Example 3-3

4 g of the hydroxyl group-containing solution A was put into a 1000 ml-four neck-flask at room temperature, and diluted by adding 496 g of toluene to obtain the solution for forming an organic thin film C.

Example 3-4

5.7 g of the hydroxyl group-containing solution B was put into a 1000 ml-four neck-flask at room temperature, and diluted by adding 494.3 g of toluene to obtain the solution for forming an organic thin film D.

Example 3-5

250 g of the hydroxyl group-containing solution C was put into a 1000 ml-four neck-flask at room temperature, and diluted by adding 250 g of toluene, to obtain the solution for forming an organic thin film E.

Example 3-6

20 g of the hydroxyl group-containing solution D was put into a 1000 ml-four neck-flask at room temperature, and diluted by adding 480 g of toluene to obtain the solution for forming an organic thin film F.

Example 3-7

20 g of the hydroxyl group-containing solution E was put into a 1000 ml-four neck-flask at room temperature, and diluted by adding 480 g of toluene to obtain the solution for forming an organic thin film G.

Example 3-8

20 g of the hydroxyl group-containing solution F was put into a 1000 ml-four neck-flask at room temperature, and diluted by adding 480 g of toluene to obtain the solution for forming an organic thin film H.

Example 3-9

20 g of the hydroxyl group-containing solution G was put into a 1000 ml-four neck-flask at room temperature, and diluted by adding 480 g of toluene to obtain the solution for forming an organic thin film I.

Example 3-10

20 g of the hydroxyl group-containing solution H was put into a 1000 ml-four neck-flask at room temperature, and diluted by adding 480 g of Sorbesso 150 to obtain the solution for forming an organic thin film J.

Example 3-11

20 g of the hydroxyl group-containing solution H was put into a 1000 ml-four neck-flask at room temperature, and diluted by adding 480 g of n-decane to obtain the solution for forming an organic thin film K.

Example 3-12

20 g of the hydroxyl group-containing solution I was put into a 1000 ml-four neck-flask at room temperature, and diluted by adding 480 g of toluene to obtain the solution for forming an organic thin film L.

Example 3-13

20 g of the hydroxyl group-containing solution J was put into a 1000 ml-four neck-flask at room temperature, and diluted by adding 480 g of toluene to obtain the solution for forming an organic thin film M.

Example 3-14

20 g of the hydroxyl group-containing solution K was put into a 1000 ml-four neck-flask at room temperature, and diluted by adding 480 g of toluene to obtain the solution for forming an organic thin film N.

Example 3-15

20 g of the hydroxyl group-containing solution L was put into a 1000 ml-four neck-flask at room temperature, and diluted by adding 480 g of toluene to obtain the solution for forming an organic thin film O.

Example 3-16

20 g of the hydroxyl group-containing solution M was put into a 1000 ml-four neck-flask at room temperature, and diluted by adding 480 g of toluene to obtain the solution for forming an organic thin film P.

Example 3-17

20 g of the hydroxyl group-containing solution A was put into a 1000 ml-four neck-flask at room temperature, and diluted by adding 480 g of dehydrated toluene (water content: 7.1 ppm) to obtain the solution for forming an organic thin film Q.

Example 3-18

20 g of the hydroxyl group-containing solution H was put into a 1000 ml-four neck-flask at room temperature, and diluted by adding 480 g of dehydrated Sorbesso 150 (water content: 8.1 ppm) to obtain the solution for forming an organic thin film R.

Example 3-19

20 g of the hydroxyl group-containing solution H was put into a 1000 ml-four neck-flask at room temperature, and diluted by adding 480 g of dehydrated n-decane (water content: 5.0 ppm) to obtain the solution for forming an organic thin film S.

Example 3-20

20 g of the hydroxyl group-containing solution N was put into a 1000 ml-four neck-flask at room temperature, and diluted by adding 480 g of toluene to obtain the solution for forming an organic thin film T.

Example 3-21

20 g of the hydroxyl group-containing solution P was put into a 1000 ml-four neck-flask at room temperature, and diluted by adding 480 g of toluene to obtain the solution for forming an organic thin film V.

Example 3-22

20 g of the hydroxyl group-containing solution Q was put into a 1000 ml-four neck-flask at room temperature, and diluted by adding 480 g of toluene to obtain the solution for forming an organic thin film W.

Example 3-23

20 g of the hydroxyl group-containing solution R was put into a 1000 ml-four neck-flask at room temperature, and diluted by adding 480 g of toluene to obtain the solution for forming an organic thin film X.

Example 3-24

20 g of the hydroxyl group-containing solution O was put into a 1000 ml-four neck-flask at room temperature, and diluted by adding 480 g of toluene to obtain the solution for forming an organic thin film U.

Example 3-25

Kg of the hydroxyl group-containing solution P was put into a 2000 L-reaction vessel at room temperature, and diluted by adding 720 Kg of toluene to obtain the solution for forming an organic thin film Y.

Comparative Example

Production Method Described in WO2006/009202

6.45 g (16.4 mmol) of octadecyltrimethoxysilane (Gelest; purity: 95%) was put into a 2000 ml-four neck-flask at room temperature, 2.5 g of the adjuvant for forming an organic thin film. B obtained in Example 1-2 was added, and the mixture was diluted by adding 991 g of toluene.

[Formation of an Organic Thin Film]

Ultrasonic washing was performed to a substrate with pure water and alcohol as prewashing, followed by a UV ozone treatment. The substrate was immersed into the solution for forming an organic thin film for a certain time, and then pulled up, subjected to an ultrasonic washing with an organic solvent, dried at 60° C. for 10 min to form an organic thin film.

[Evaluation Test of Thin Film Properties]

The organic thin film was evaluated by the following method.

(1) Measurement of Contact Angle

5 μl of water or tetradecane (hereinafter abbreviated as "TD") was dropped from a microsilinge to each substrate surface, and the contact angle was measured 60 sec later with a contact angle measuring device (360S; Erma)

The results are shown in Table 1.

Further, a substrate was immersed in each of the solution for forming an organic thin film obtained in Example 3-1 (product of the present invention) and the solution for forming an organic thin film obtained in Comparative Example (conventional product) for 1 sec, 10 sec, 30 sec, 1 min, 3 min, 5 min, and 10 min, respectively, and then pulled up. The thin film formed on the substrate surface was investigated by an observation with an atomic force microscope, and by the above contact angle measurement. As a result, the film formation of the present invention had an acceptance quality level with a sec-immersion, while the film formation of the conventional product reached an acceptance quality level with a 1 min-immersion.

TABLE 1

| | Solution for forming an organic thin film | | | | Contact angle (°) | |
|---|---|---|---|---|---|---|
| No. | type | Water content (ppm) | substrate | Immersion time (min) | water | TD |
| 1 | A | 316 | SLG | 1 | 109.2 | 38.0 |
| 2 | A | 316 | AN100 | 1 | 107.0 | 41.8 |
| 3 | A | 316 | PD200 | 1 | 109.4 | 39.0 |
| 4 | A | 316 | Si waf | 1 | 111.8 | 37.5 |
| 5 | A | 316 | SUS304 | 1 | 107.8 | 37.9 |
| 6 | A | 316 | Ni | 1 | 107.0 | 38.1 |
| 7 | A | 316 | Cu | 1 | 107.5 | 39.0 |
| 8 | A | 316 | Al | 1 | 110.4 | 38.4 |
| 9 | B | 301 | AN100 | 1 | 104.6 | 37.2 |
| 10 | C | 307 | AN100 | 1 | 105.9 | 37.4 |
| 11 | D | 321 | AN100 | 1 | 105.1 | 39.2 |
| 12 | E | 333 | AN100 | 1 | 108.9 | 38.1 |

TABLE 1-continued

| | Solution for forming an organic thin film | | | Immersion | Contact angle (°) | |
|---|---|---|---|---|---|---|
| No. | type | Water content (ppm) | substrate | time (min) | water | TD |
| 13 | F | 346 | AN100 | 1 | 107.7 | 39.4 |
| 14 | G | 320 | AN100 | 1 | 108.4 | 37.8 |
| 15 | H | 311 | AN100 | 1 | 109.4 | 39.7 |
| 16 | I | 329 | AN100 | 1 | 107.3 | 38.5 |
| 17 | J | 172 | AN100 | 1 | 106.5 | 39.5 |
| 18 | K | 51 | AN100 | 1 | 105.5 | 39.1 |
| 19 | L | 221 | AN100 | 30 | 101.4 | 38.3 |
| 20 | M | 216 | AN100 | 10 | 105.8 | 38.2 |
| 21 | N | 332 | AN100 | 1 | 109.8 | 41.9 |
| 22 | O | 355 | AN100 | 1 | 108.6 | 42.1 |
| 23 | P | 353 | AN100 | 1 | 103.6 | 38.3 |
| 24 | Q | 47 | AN100 | 1 | 106.9 | 39.9 |
| 25 | R | 34 | AN100 | 1 | 106.9 | 41.5 |
| 26 | S | 29 | AN100 | 1 | 105.3 | 38.1 |
| 27 | T | 311 | AN100 | 1 | 103.3 | 35.1 |
| 28 | U | 320 | AN100 | 1 | 101.3 | 30.5 |
| 29 | V | 213 | AN100 | 1 | 106.8 | 40.2 |
| 30 | W | 235 | AN100 | 1 | 104.7 | 40.9 |
| 31 | X | 282 | AN100 | 1 | 105.9 | 41.6 |
| 32 | Y | 215 | AN100 | 1 | 108.9 | 38.6 |

EXPLANATION OF THE ABBREVIATION

SLG: Soda lime glass
AN100: Non-alkaline glass (Asahi Glass)
PD200: Kali glass (Asahi Glass)
Si waf: Silicone wafer
SUS 304: Stainless steel
Ni: Nickel plate
Cu: Copper plate
Al: Aluminum plate (2) Measurement of Crystalline Property Each formed thin film was measured with a thin film X-ray diffraction device (Rigaku: Smart Labo). As a result, a peak was obtained around $2\theta_{\chi/\varphi}=21.5°$ by an in-plane measurement for all of the thin films, which revealed that the films were crystalline monomolecular.

Further, a substrate was immersed into each of the solution for forming an organic thin film obtained in Example 3-1 (product of the present invention), and the solution for forming an organic thin film obtained in Comparative Example (conventional product) for a certain time, and then pulled up, and the thin film formed on the substrate surface was measured with the above-mentioned thin film X-ray diffraction device by an out-of-plane measurement. The minimal level around $2\theta/w=1.8°$, and the maximal level around $2\theta/w=2.2°$ derived from a monomolecular layer were observed from 10 sec after immersion for the present invention, and from 3 min after immersion for the conventional product.

(3) Measurement of Lubricity

The lubricity of the thin film formed on the substrate surface was evaluated for the solution for forming an organic thin film obtained in Example 3-1 (the present invention) and the solution for forming an organic thin film obtained in Comparative Example (conventional product) after immersing a substrate in each of the solution for a certain time, and then pulled up. The evaluation was performed with Drop Master 700 (Kyowa Interface Science) by using butylcarbitolacetate as a dropplet, by measuring the dynamic contact angle of the thin film. The measurement of dynamic contact angle is a method performed according to the difference of angle of advance and angle of reverse of the droplet, which is specifically described in Japanese Laid-Open Patent Application No. 2006-150721.

By comparing the present invention and the conventional product by this method, as it is shown in FIG. 1, the difference between the angle of advance and the angle of reverse is smaller for the present invention, thus showing an excellent lubricity.

INDUSTRIAL APPLICABILITY

According to the method for forming an organic thin film of the present invention, even with an amount of water lower than that used in WO2006/009202, a dense monomolecular film with less impurity (organic thin film) can be quickly formed on a substrate made of various materials.

Specifically, as it is shown in the following Examples, according to the present method, a monomolecular film is formed in about 10 sec, while with the method of WO2006/009202, it takes at least about 1 min. Further, by comparing the thin film prepared with the method of the present invention and the thin film prepared with the method of WO2006/009202, the thin film prepared with the method of the present invention shows an excellent lubricity compared to the thin film prepared with the method of WO2006/009202.

According to the method for forming an organic thin film of the present invention, a dense and uniform organic thin film can be formed 2 or more times by using the same solution.

The method for forming an organic thin film of the present invention can be applied suitably for forming design pattern of electric devices, for equipments which require a heat-resistant, weather-resistant, and abrasion-resistant ultra thin film coating, such as electrical appliances, car, industrial devices, mirror, optical lenses, etc.

The solution for forming an organic thin film of the present invention can be used suitably in the method for forming an organic thin film of the present invention. According to the solution for forming an organic thin film of the present invention, a dense self-assembled monomolecular film with less impurity, or a monomolecular uniform film with an excellent adhesiveness, which is a chemisorbed film having a high crystalline property even on a noncrystalline substrate, regardless of the material and crystalline property of the substrate, can be formed.

The invention claimed is:

1. A solution for forming an organic thin film, comprising wherein
   a metal surfactant,
   a compound (C) that can interact with the metal surfactant, and
   a hydroxyl group-containing compound that is a hydrolysate of the metal surfactant,
   wherein the amount of the hydroxyl group-containing compound that is a hydrolysate of the metal surfactant is 20 ppm to 6 wt %, and the amount of the compound (C) that can interact with the metal surfactant is 0.03 ppm to 2 ppm in terms of a metal in compound (C), relative to the total amount of the solution for forming an organic thin film.

* * * * *